Dec. 13, 1966  B. P. NUTTER  3,291,219
WELL TESTER
Filed Nov. 6, 1964  16 Sheets-Sheet 1
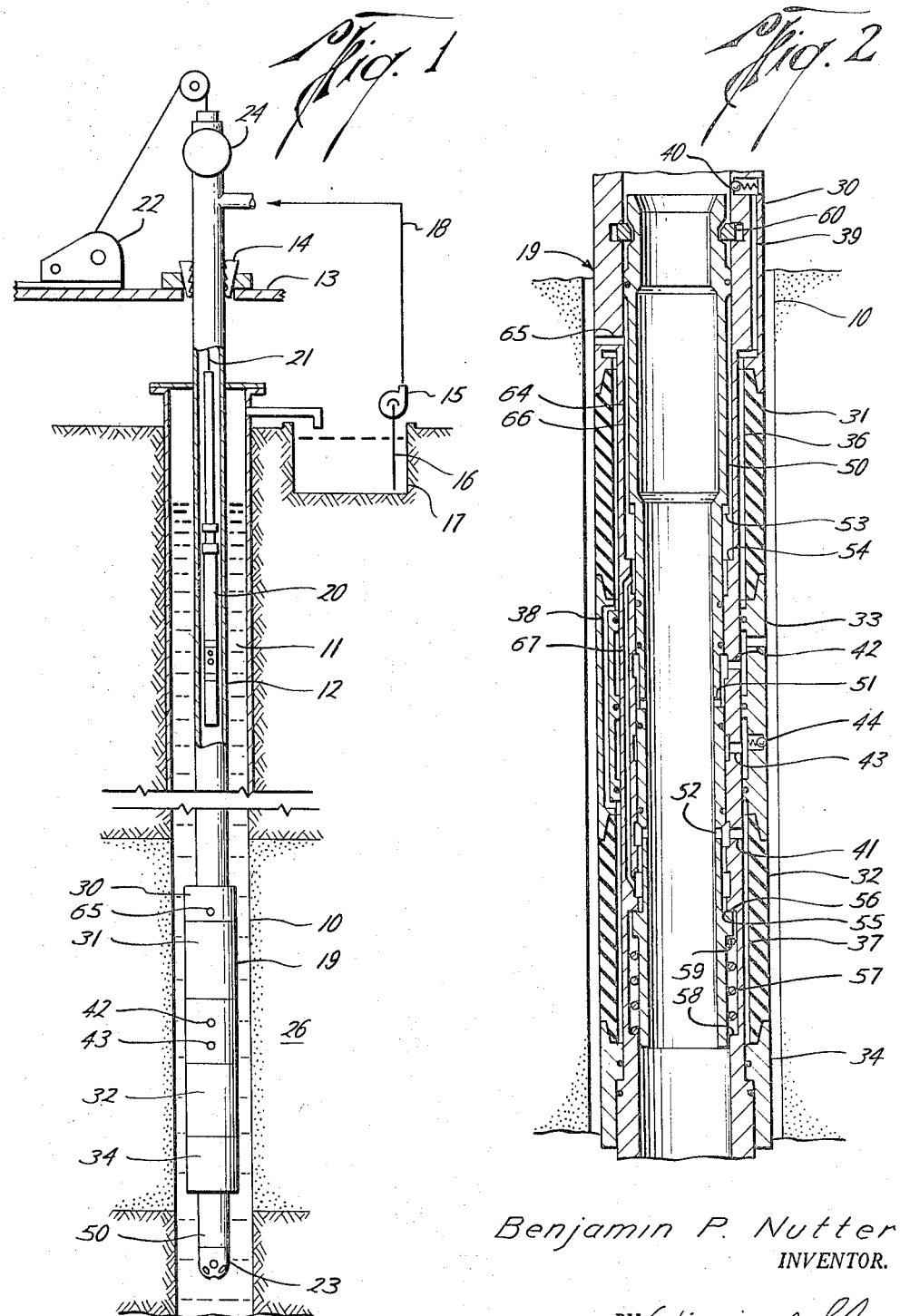
Benjamin P. Nutter
INVENTOR.
BY William R. Sherman
ATTORNEY

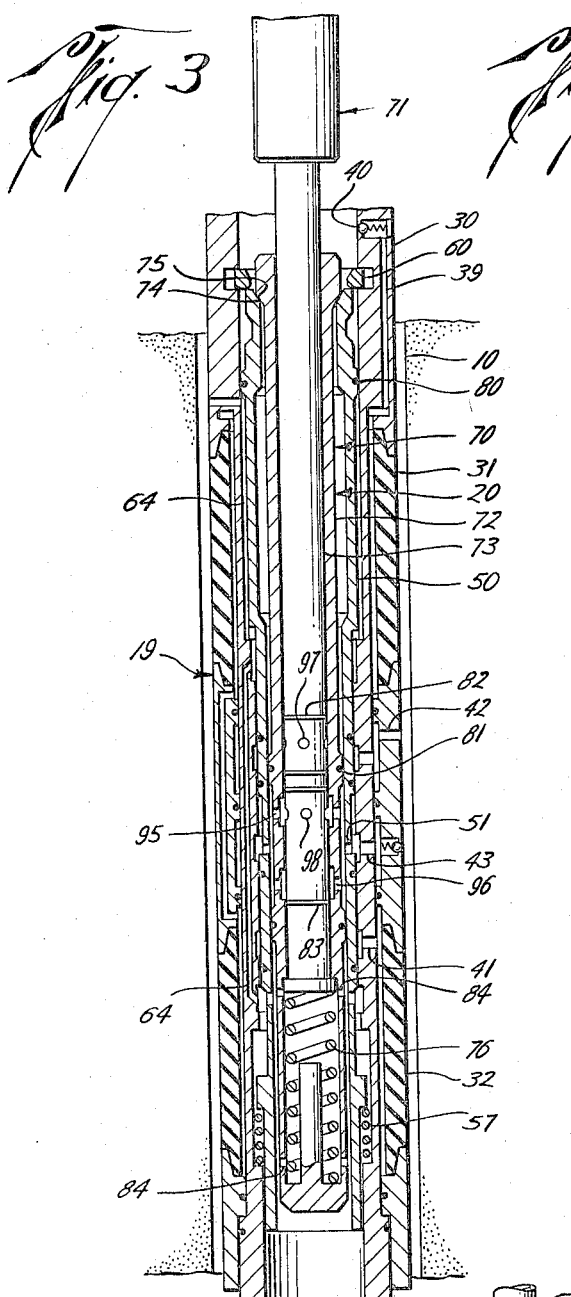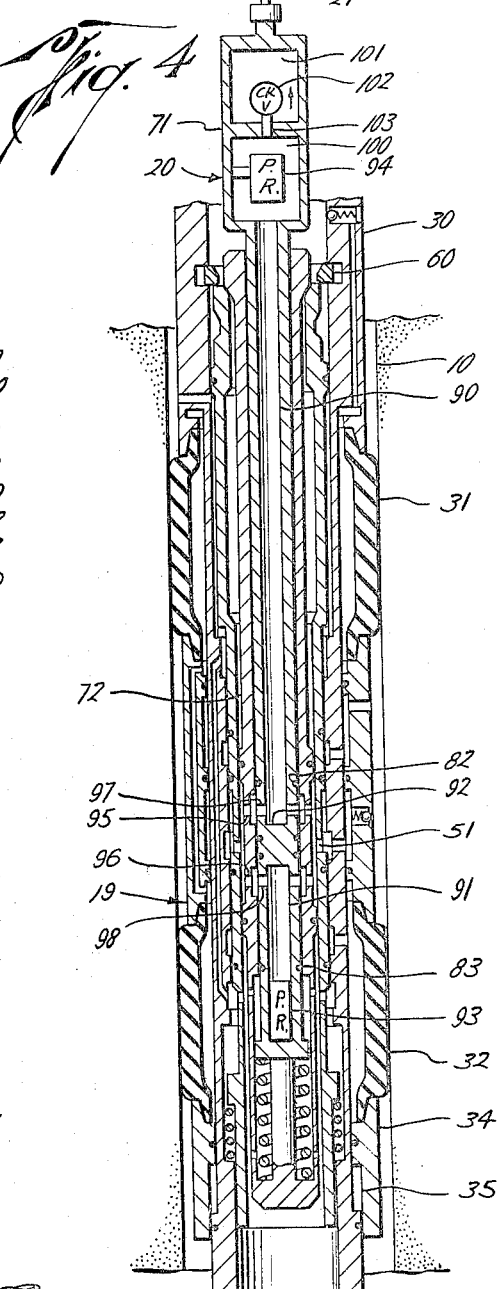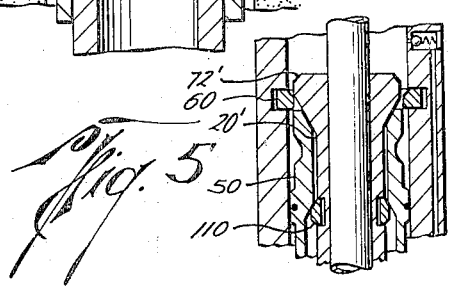
Benjamin P. Nutter
INVENTOR.

Dec. 13, 1966  B. P. NUTTER  3,291,219
WELL TESTER
Filed Nov. 6, 1964  16 Sheets-Sheet 3

Benjamin P. Nutter
INVENTOR.

BY William R. Sherman

ATTORNEY

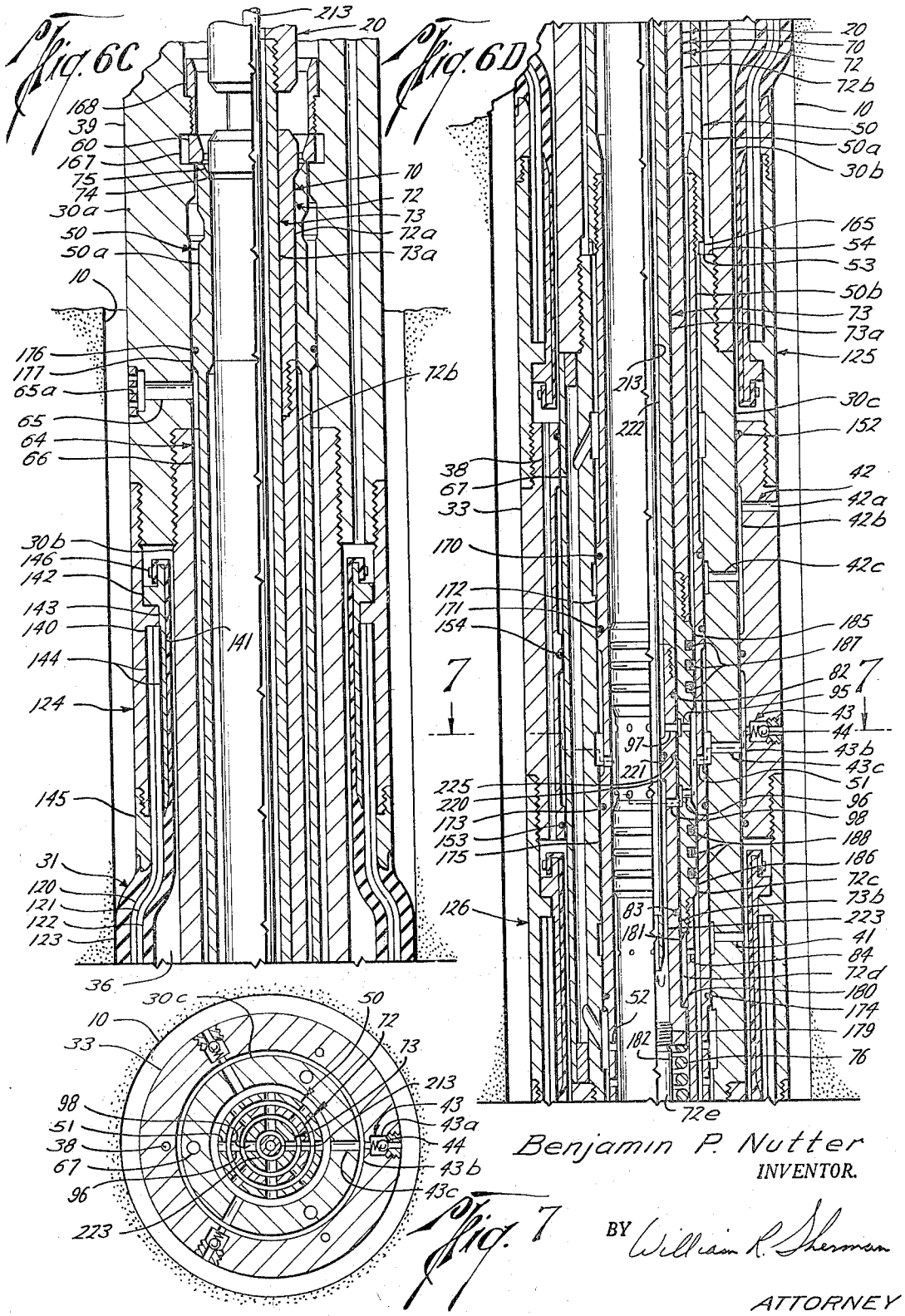

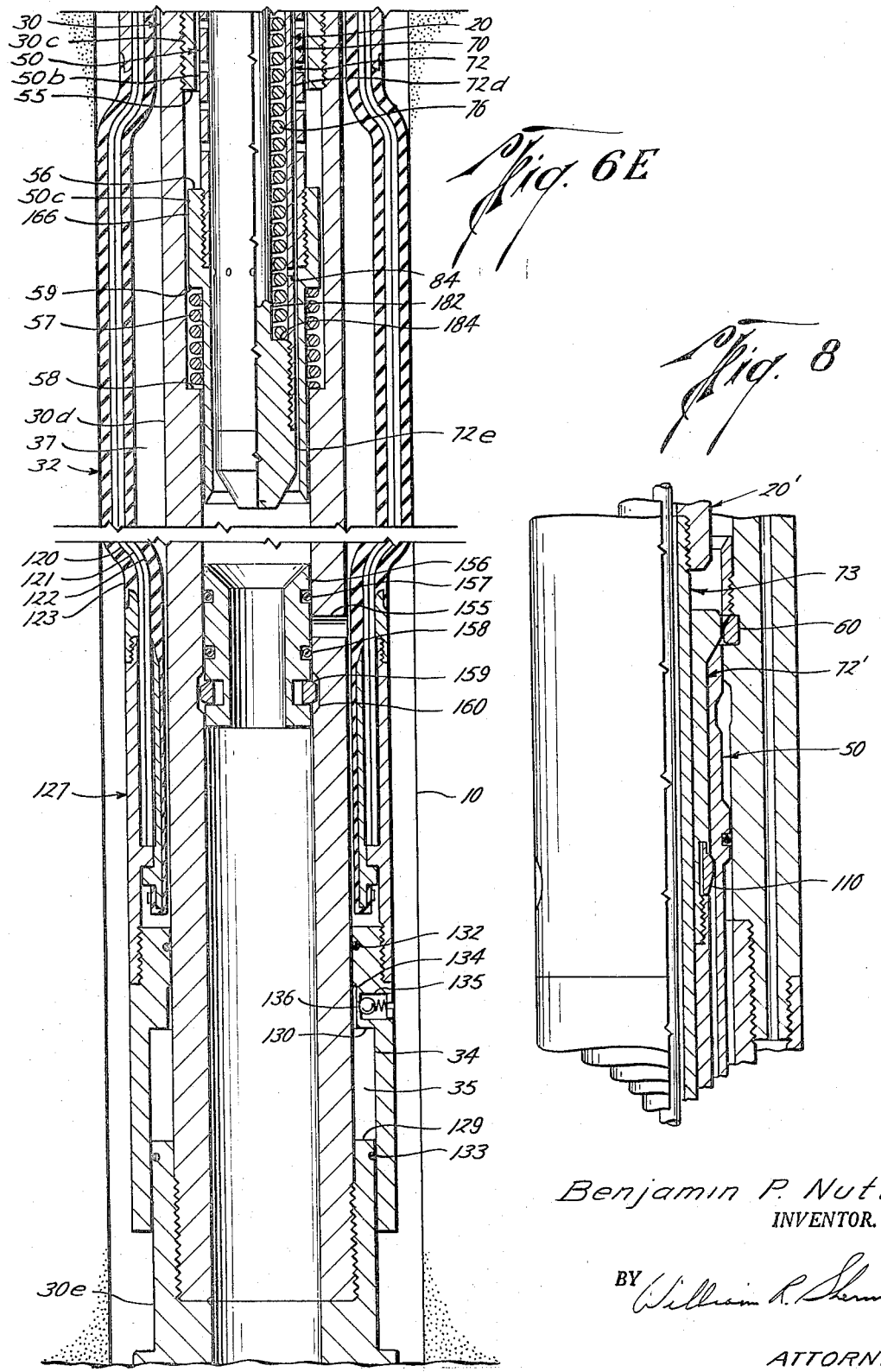

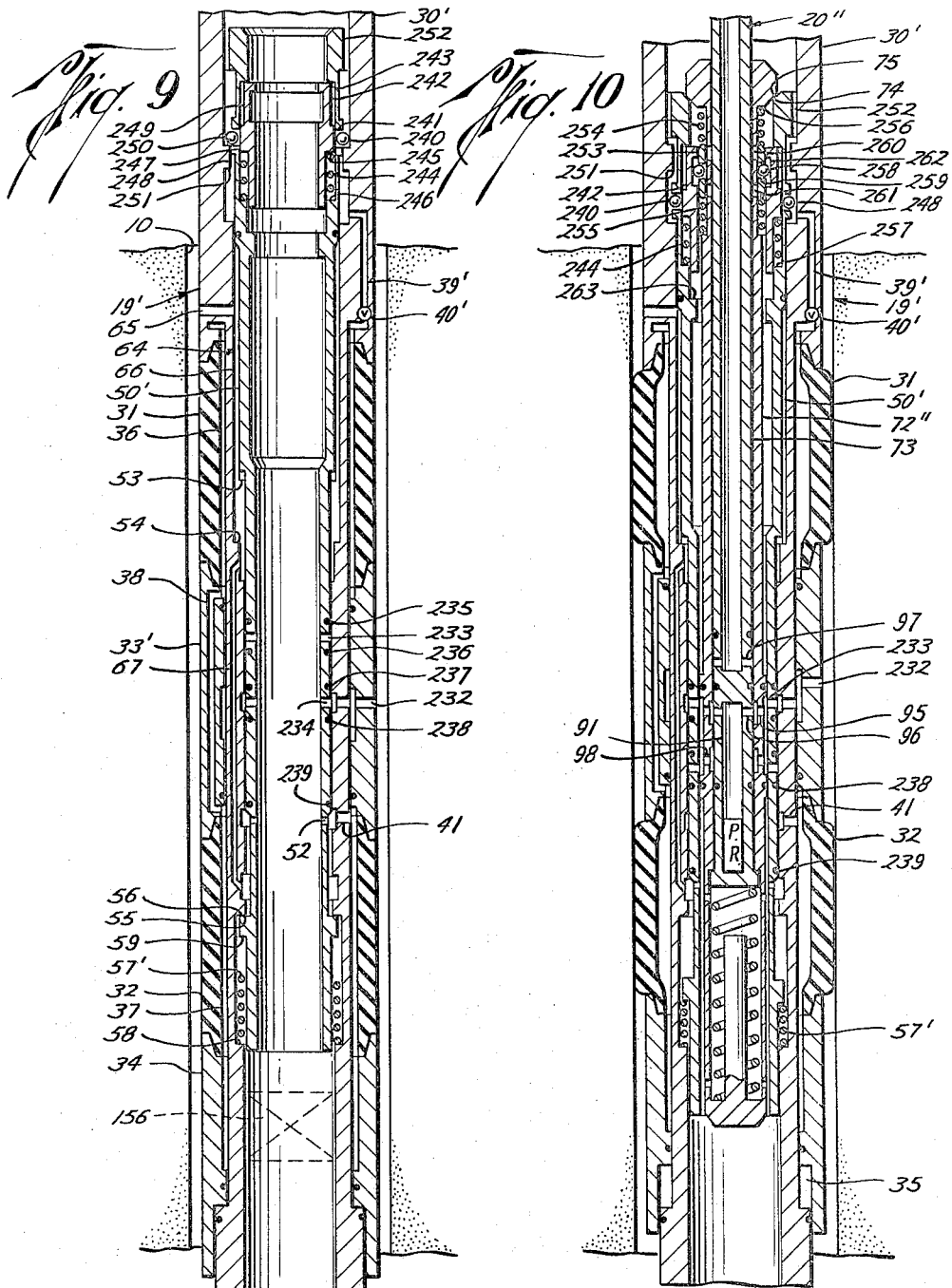

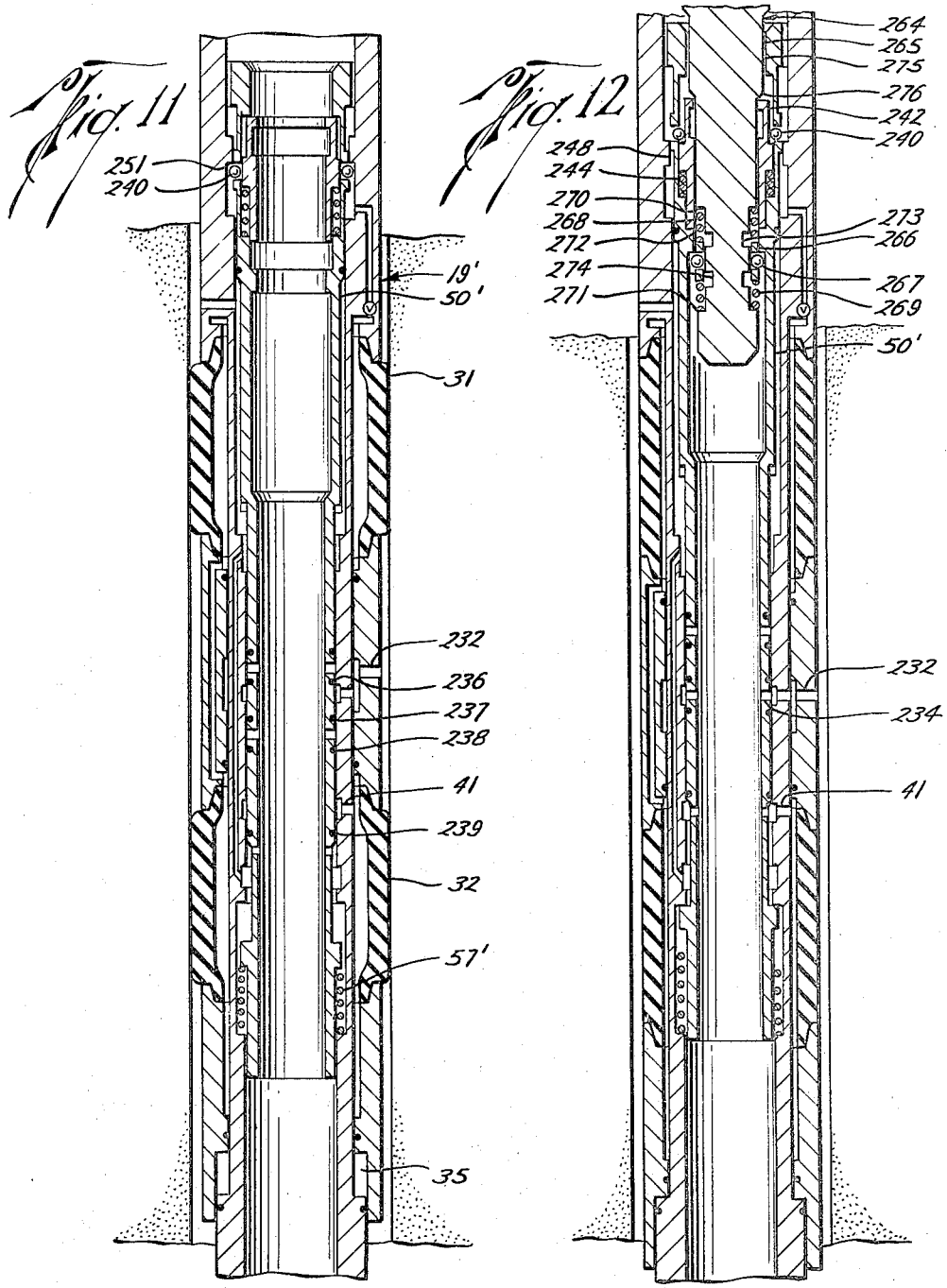

Dec. 13, 1966  B. P. NUTTER  3,291,219
WELL TESTER
Filed Nov. 6, 1964  16 Sheets-Sheet 8

Benjamin P. Nutter
INVENTOR.

BY William R. Sherman

ATTORNEY

Dec. 13, 1966 — B. P. NUTTER — 3,291,219
WELL TESTER
Filed Nov. 6, 1964 — 16 Sheets-Sheet 9
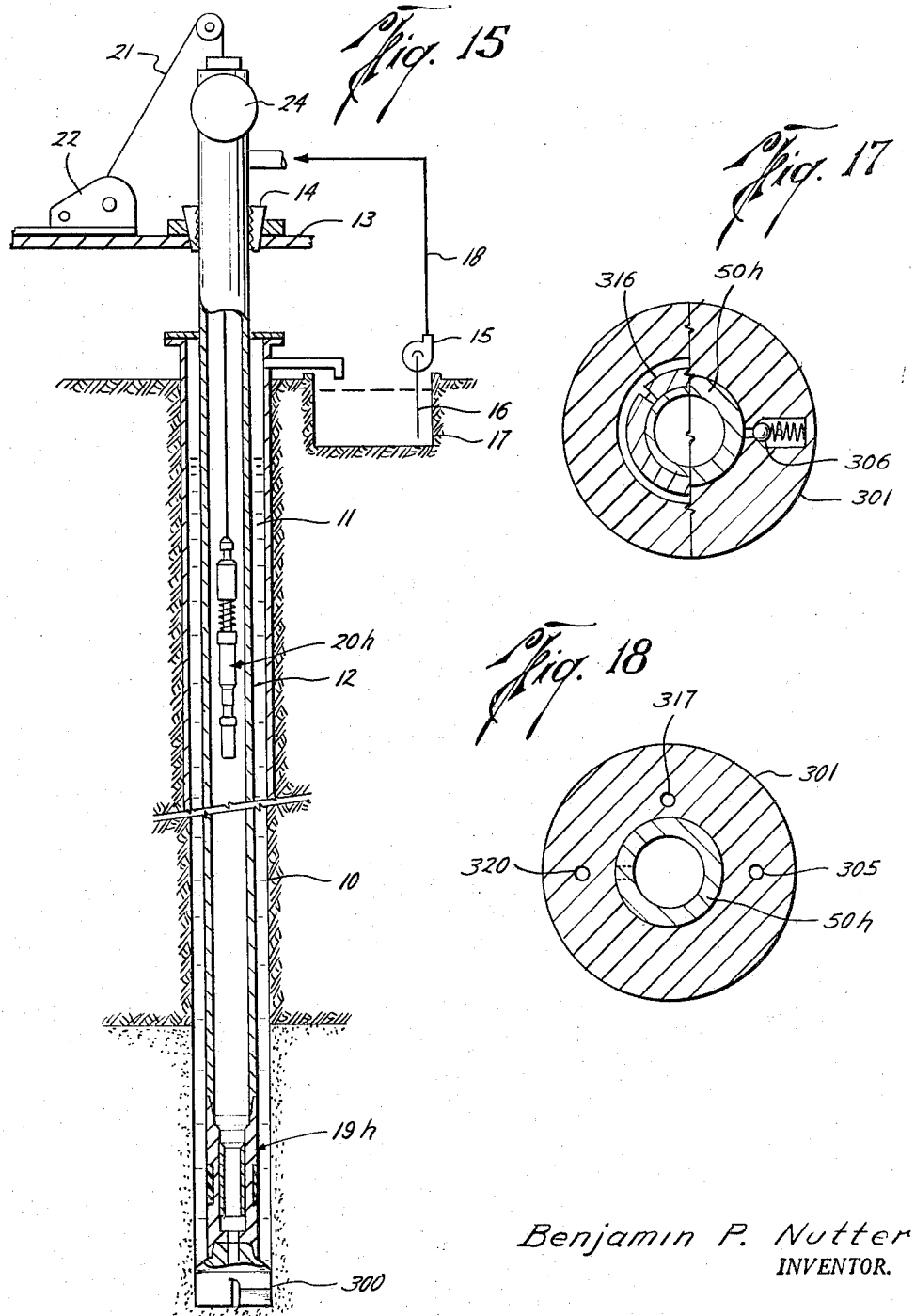
Benjamin P. Nutter
INVENTOR.
BY William R. Sherman
ATTORNEY Dec. 13, 1966 B. P. NUTTER 3,291,219
WELL TESTER
Filed Nov. 6, 1964 16 Sheets-Sheet 10
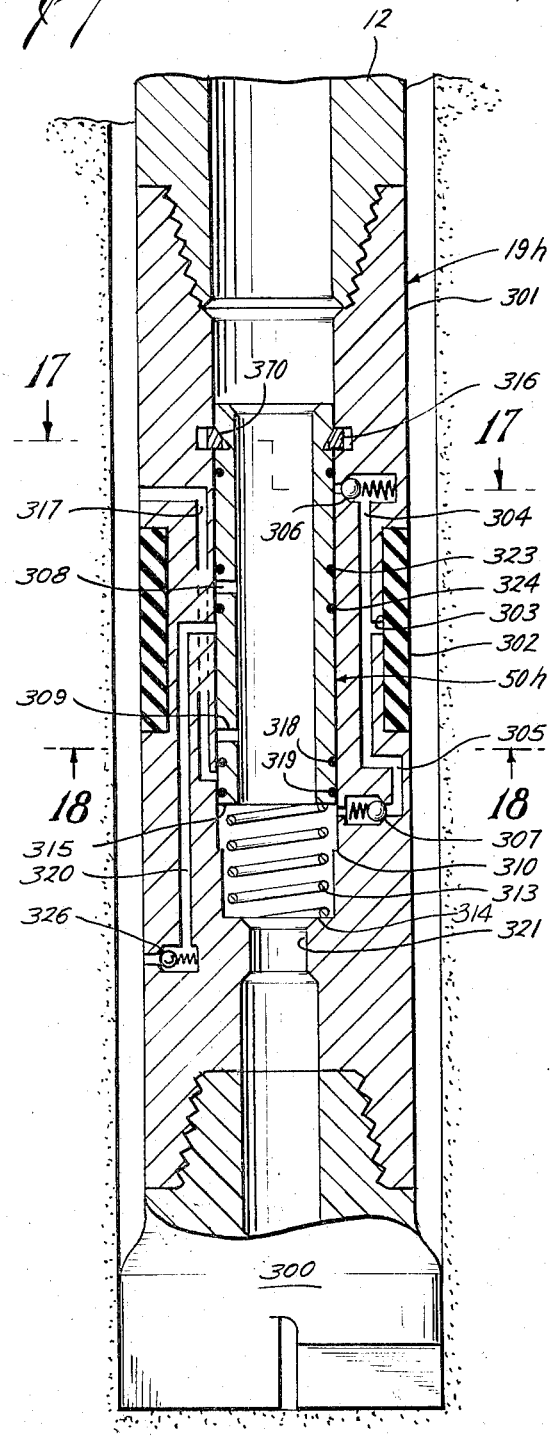
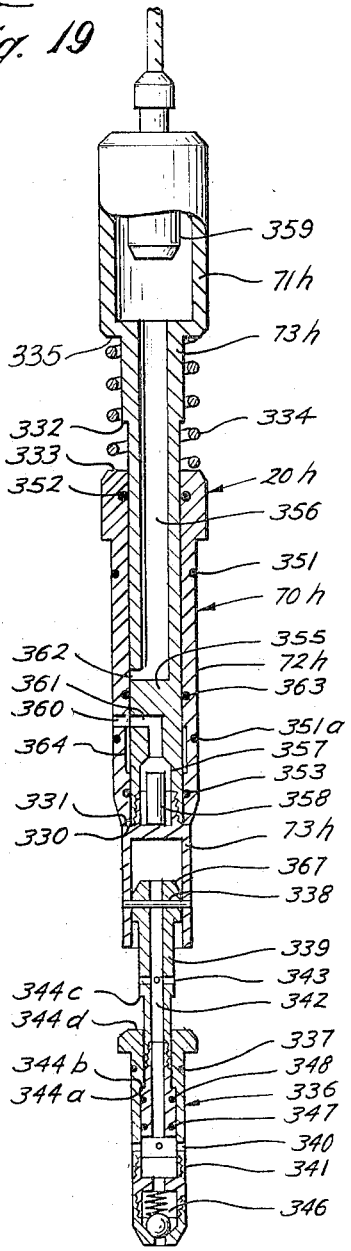
Benjamin P. Nutter
INVENTOR.
BY William R. Sherman
ATTORNEY

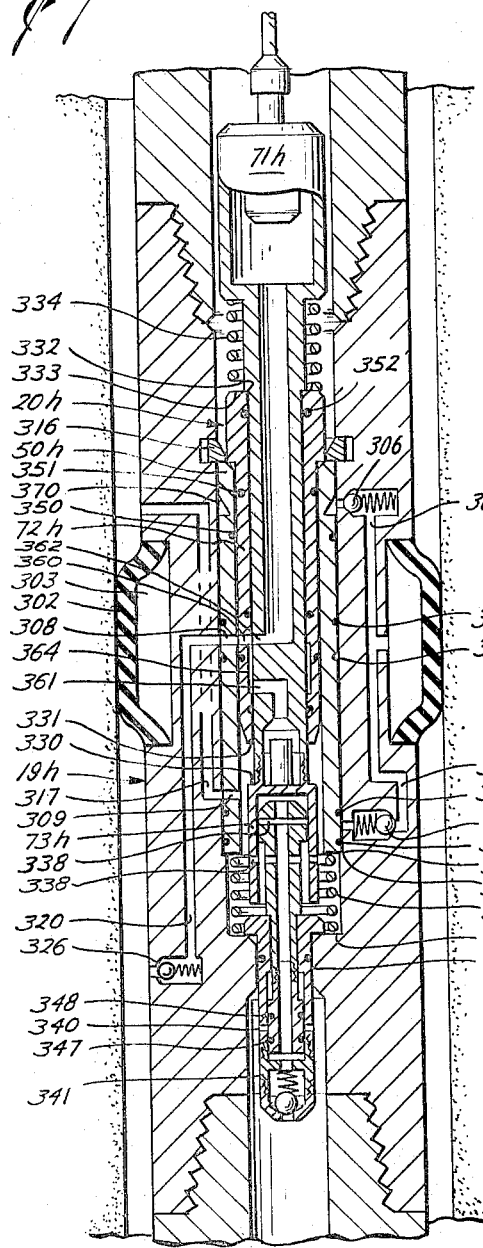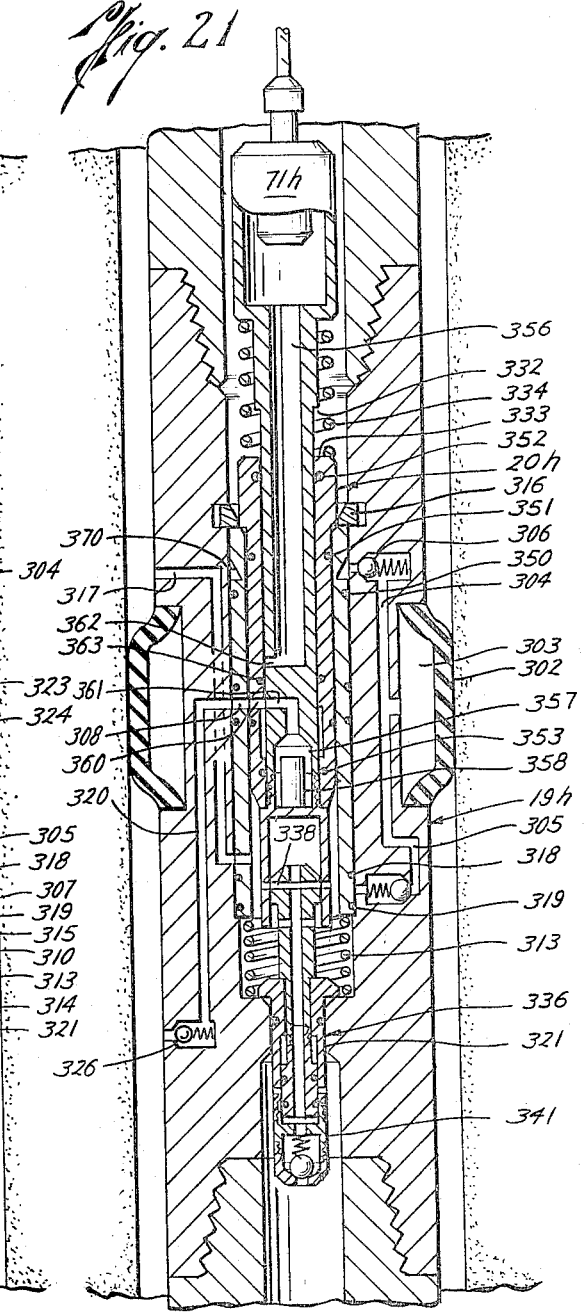
Benjamin P. Nutter
INVENTOR.

Dec. 13, 1966   B. P. NUTTER   3,291,219
WELL TESTER

Filed Nov. 6, 1964   16 Sheets-Sheet 12

Benjamin P. Nutter
INVENTOR.

BY William R. Sherman
ATTORNEY

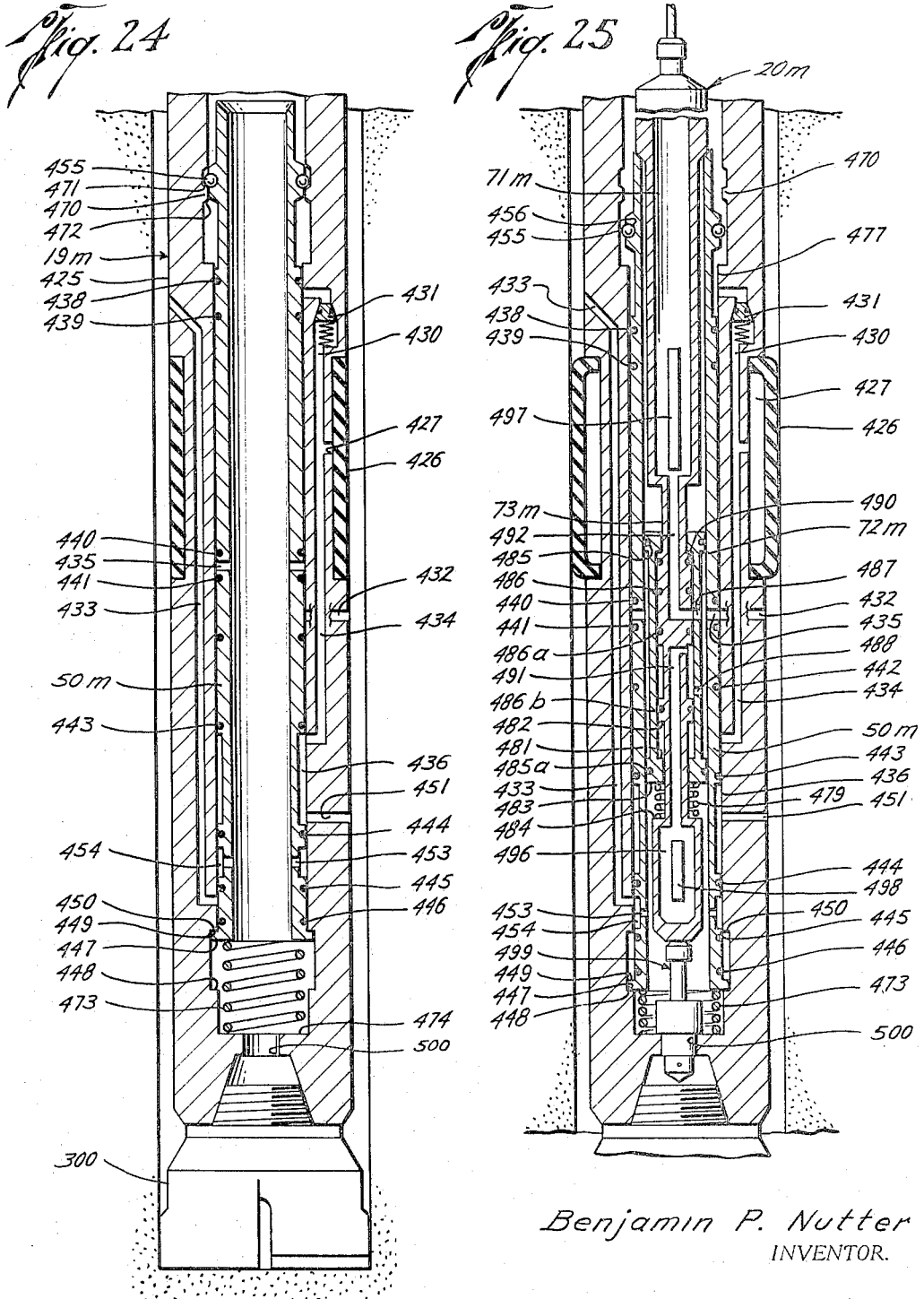

Dec. 13, 1966  B. P. NUTTER  3,291,219
WELL TESTER

Filed Nov. 6, 1964  16 Sheets-Sheet 14

Benjamin P. Nutter
INVENTOR.

BY *William R. Sherman*

ATTORNEY

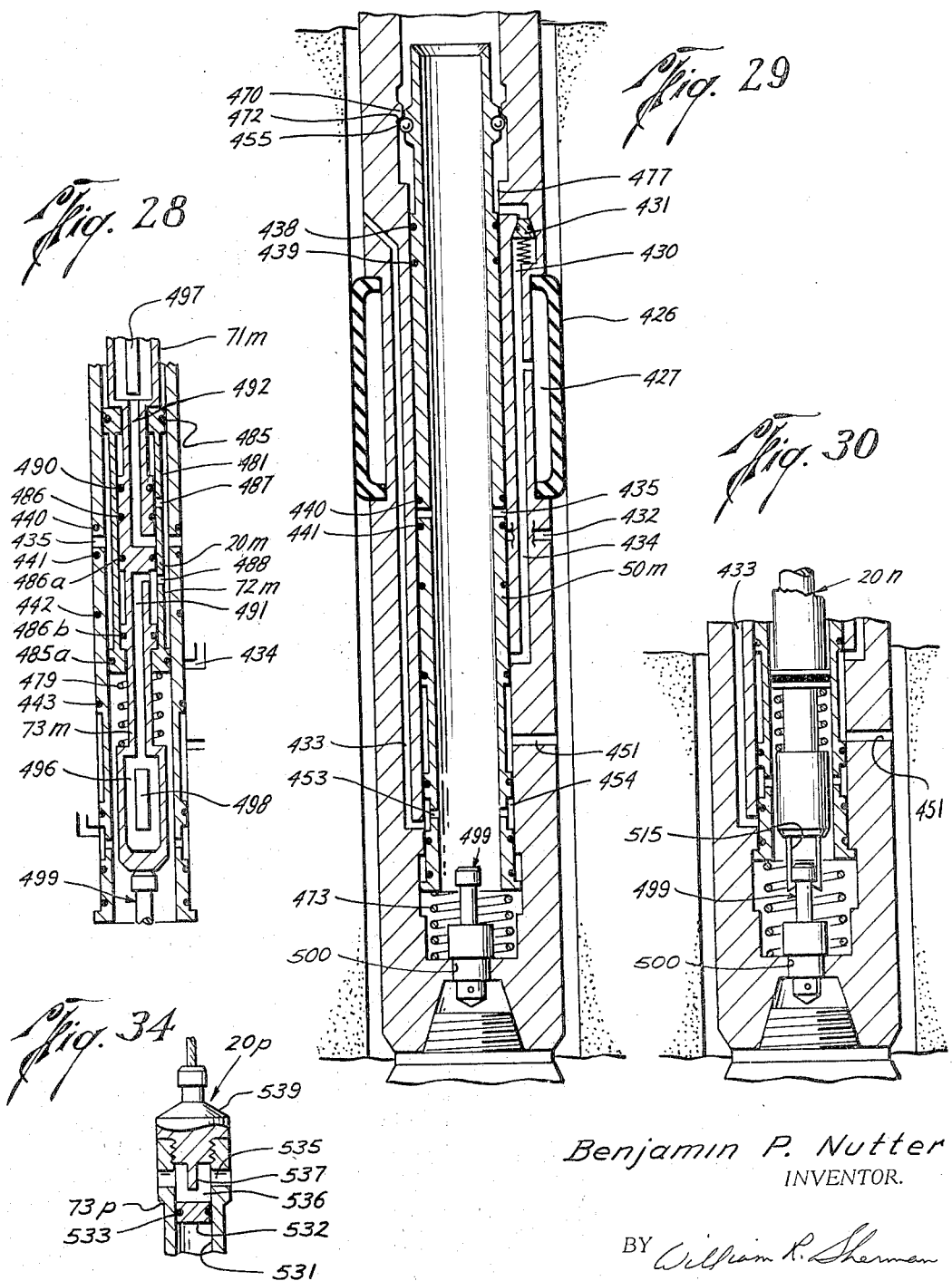

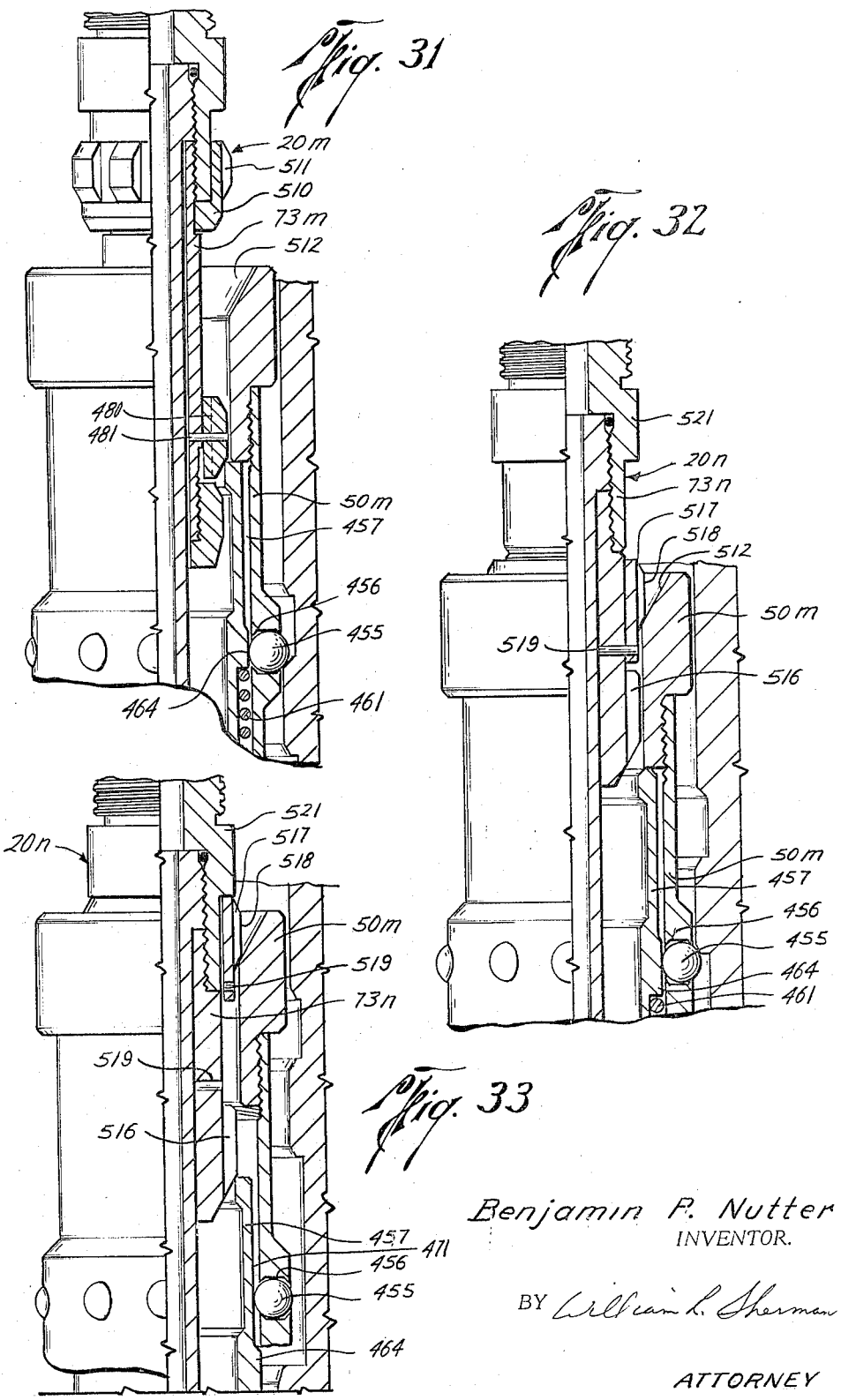

United States Patent Office 3,291,219
Patented Dec. 13, 1966

3,291,219
WELL TESTER
Benjamin P. Nutter, Houston, Tex., assignor to Schlumberger Well Surveying Corporation, Houston, Tex., a corporation of Texas
Filed Nov. 6, 1964, Ser. No. 410,828
34 Claims. (Cl. 166—145)

This is a continuation-in-part of application Serial No. 143,731 filed October 9, 1961, now abandoned.

This invention relates to well tools and, more particularly, to well testing tools of the type having a packer assembly which is positioned within the well bore by means of a string of drill or other well pipe and having a retrievable sampler assembly which is lowered and raised through the bore of the pipe string to perform multiple testing and treating operations successively without removing the pipe string from the well.

In well-testing operations it is desirable to recover an uncontaminated sample of the formation fluids. However, most potential productive formations are invaded by a fluid filtrate derived from the drilling fluid which fills the well bore during the drilling and testing operations. This filtrate may be produced in substantial quantities along with the formation fluids, particularly during the early periods of a flow test. It therefore would be of value to conduct a flow test so that the produced fluids are recovered in discrete quantities segregated according to their order of production or to recover successive flow samples without re-exposing the formation to drilling fluid pressure and contamination between tests.

Moreover, it is further desirable in well-testing operations to obtain accurate measurements of various formation pressures. Of particular interest to well operators is the formation "shut-in" pressure, i.e., the actual hydraulic pressure within the virgin formation. Before a shut-in pressure measurement can be obtained, fluid from the isolated section of the borehole must be allowed to flow into the testing tool for a short period of time in order to relieve trapped hydrostatic drilling fluid pressure and the "squeeze" pressure imposed by setting the packing means. However, if the formation is allowed to flow for too long a period before taking the shut-in measurement, the pressure near the well bore will have decreased and considerable time may be required for the true formation pressure to be re-established adjacent the borehole. This is particularly true for formations of low permeability. With present well-testing tools, it is often difficult to control the length of this initial flow period with sufficient accuracy to insure a good shut-in pressure measurement. Thus, it would be desirable to provide a well testing tool having valve means which may be operated simply and positively from the surface.

It is further desirable during a well-testing operation that drilling fluid circulation may be maintained as continuously as possible and that the testing be conducted with a minimum of delay to drilling operations. With conventional well-testing equipment, fluid circulation must often be interrupted for excessively long periods of time. Thus, in particular areas where, for example, excessive caving of the well wall may occur unless fluid circulation is maintained, the time available for well-testing operations may be severally limited and testing is often completely prohibited by the necessity of maintaining fluid circulation. Thus, it would be advantageous to provide a well-testing tool which may be operated with minimum interruption of drilling fluid circulation.

Accordingly, it is an object of the invention to provide means with which treating operations may be performed, formation pressure measurements taken and samples of formation fluids recovered successively from a plurality of zones within a borehole without removing the pipe string from the well between successive tests.

A further object of the invention is to provide a testing tool with which formation pressure measurements and samples of formation fluids may be recovered successively from the same zone without re-exposing the formation to well-fluid pressure and contamination by borehole fluids between successive tests.

A further object of the invention is to provide a testing tool which may be utilized on a drill string to measure formation pressure and successive samples of formation fluids which may be obtained during drilling operations.

Still a further object of the invention is to provide a testing tool with which formation shut-in pressure measurements may be obtained before or after fluids have been allowed to flow from the test zone or at any time during the testing operation.

Yet another object of the invention is to provide a testing tool of the above-described type with which circulation of drilling fluid may be maintained in the tool and within the well bore before and after successive sample-taking operations, even with packers set.

These and other objects are attained, in accordance with the invention, by providing a well tool with a tubular body member having a bore which continues the bore of the pipe string in which it is connected. At least one packer is carried by the body member for packing off a zone of the well bore opposite a lateral test passage through the body member. In some embodiments of the invention, the well tool is particularly adapted for conducting tests and treating operations with a drill bit attached below the tool so that the tool may be used without removing the pipe string during drilling operations.

A retrievable valve assembly, when seated in the bore of the body member, has cooperatively arranged valve means for controlling fluid communication via the test passage to chambers in the assembly.

For convenient remote operation of the tool, the chamber valve means opens in response to fluid pressure applied from the surface. Such fluid pressure may also be used to expand the packer or packers carried by the body member and they may remain expanded, if desired, after the valve assembly is retrieved. Selectively, the test passage may be left in a closed position when the assembly is retrieved to isolate the packed-off zone from well bore fluids. Provision is also made for circulation of fluid through the pipe string even when the packer or packers remain set. By appropriate arrangement of pressure-measuring means within the assembly, shut-in pressure measurements may be secured when desired.

The invention and others of its objects and advantages will become apparent from the following description, taken in conjunction with the accompanying drawings, in which:

FIG. 1 is a schematic diagram showing the packer assembly portion of a well tool disposed within a borehole at the end of a pipe string and showing the retrievable portion of the tool being lowered through the bore of the string;

FIG. 2 is a simplified view, in longitudinal section, of one embodiment of the packer assembly portion of a well tool showing the parts of the apparatus in the positions normally occupied when the pipe string is being raised or lowered within the well bore;

FIG. 3 is a further view of the apparatus of FIG. 2, showing a retrievable portion of the tool, partly in longitudinal section, seated within the packer assembly;

FIG. 4 is as further view, in longitudinal section, of the apparatus illustrated in FIG. 3, showing the parts of the tool in the positions normally occupied when a fluid sample is being taken;

FIG. 5 is a fragmentary view of the upper portion of the packer assembly shown in FIGS. 2 through 4, and a portion of a modified retrievable assembly for use when taking the final fluid sample from a specific test zone.

Figure 6A:
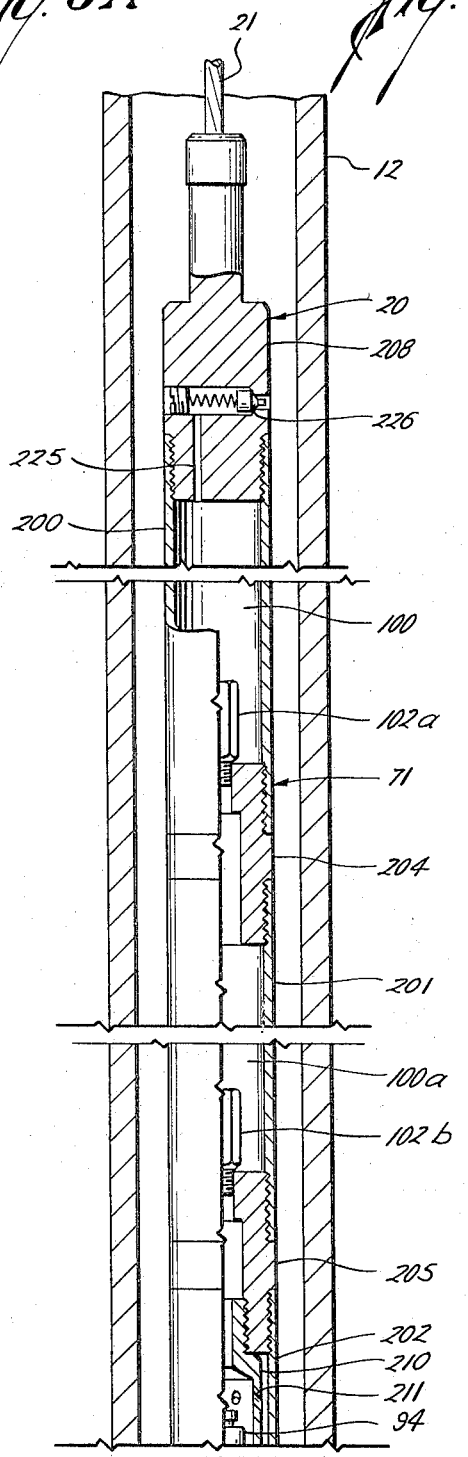
Figure 6B:
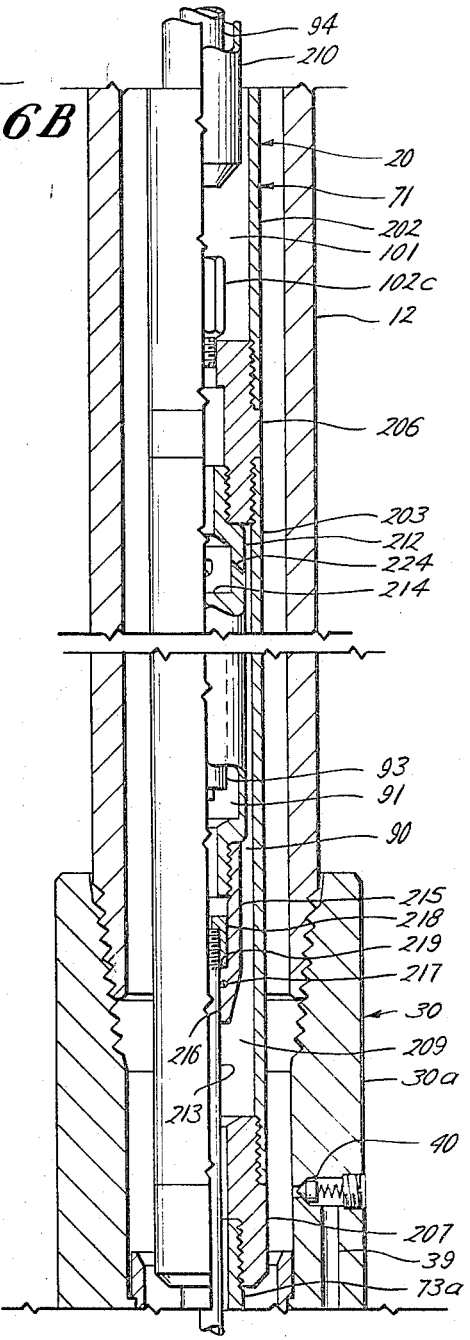

FIGS. 6A through 6E, when taken together, form a detailed composite view, partially in longitudinal section, of the well tool embodiment illustrated in FIGS. 2–4, FIG. 6A showing the uppermost portion of the tool, FIG. 6B showing the next lower portion, etc., with FIG. 6E showing the lowermost portion.

FIG. 7 is a transverse view taken along the line 7—7 of FIG. 6D.

FIG. 8 is a detailed view of the apparatus shown in FIG. 5.

FIG. 9 is a simplified view, in longitudinal section, of the packer assembly portion of a further embodiment of a well tool showing the parts of the apparatus in the positions normally occupied when the pipe string is being raised or lowered within the well bore;

FIG. 10 is a further view of the apparatus of FIG. 9 and showing, in longitudinal section, a retrievable portion of the tool seated within the packer assembly;

FIG. 11 is a further view of the apparatus of FIG. 9 showing the parts of the apparatus in the positions normally occupied between the taking of successive samples from a single test zones;

FIG. 12 is a further view of the apparatus of FIG. 9 and showing, in longitudinal section, a retrievable assembly for use in releasing the packers after the final fluid sample has been taken from a specific test zone.

Figures 13, 14:
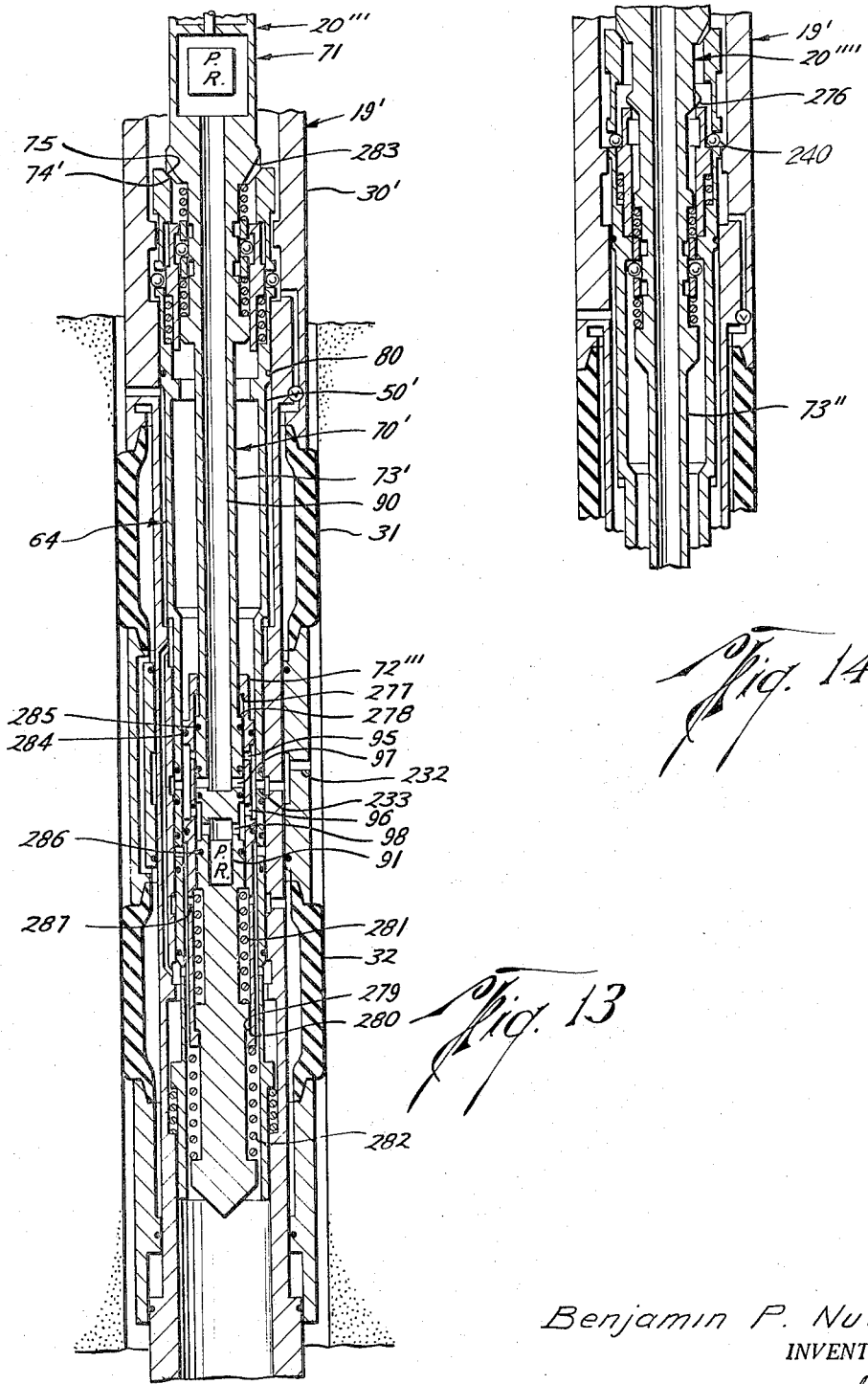
Figure 22:
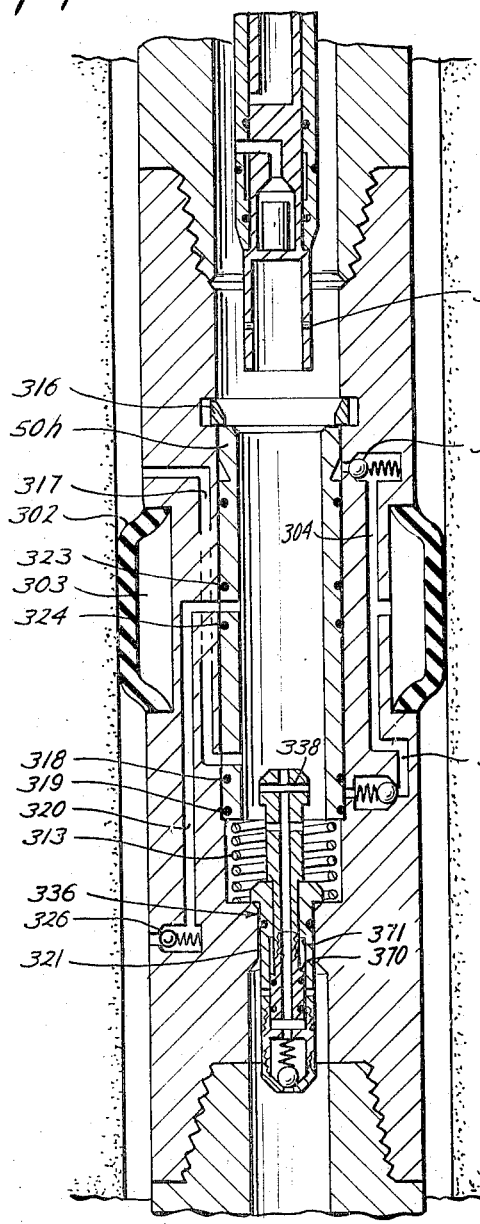
Figure 23:
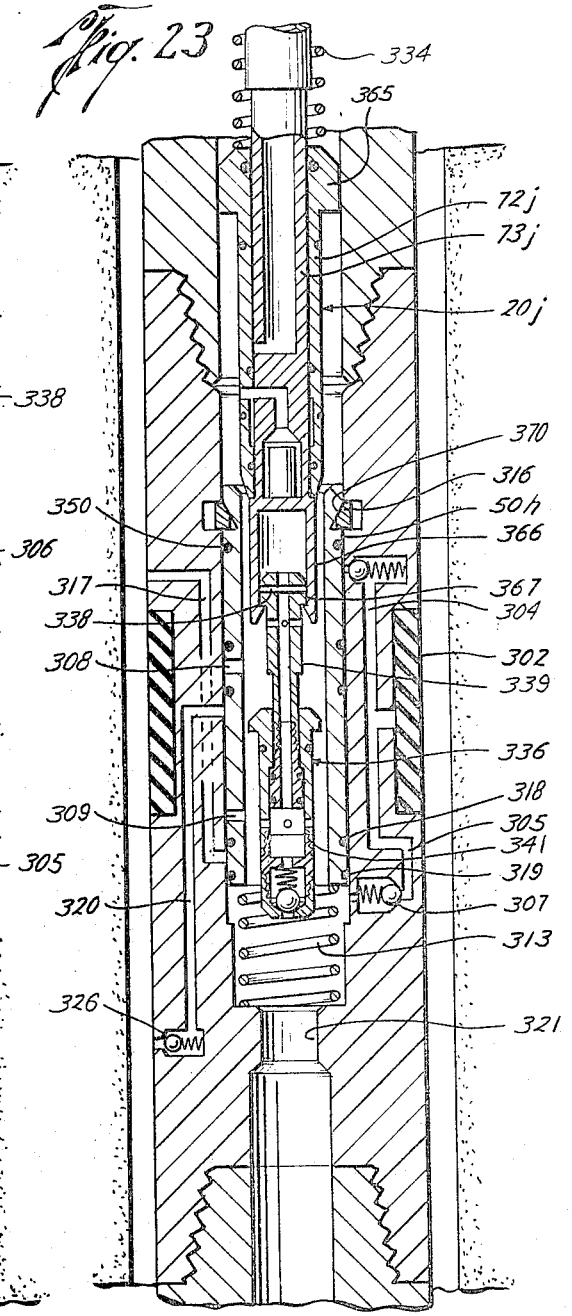
Figure 26:
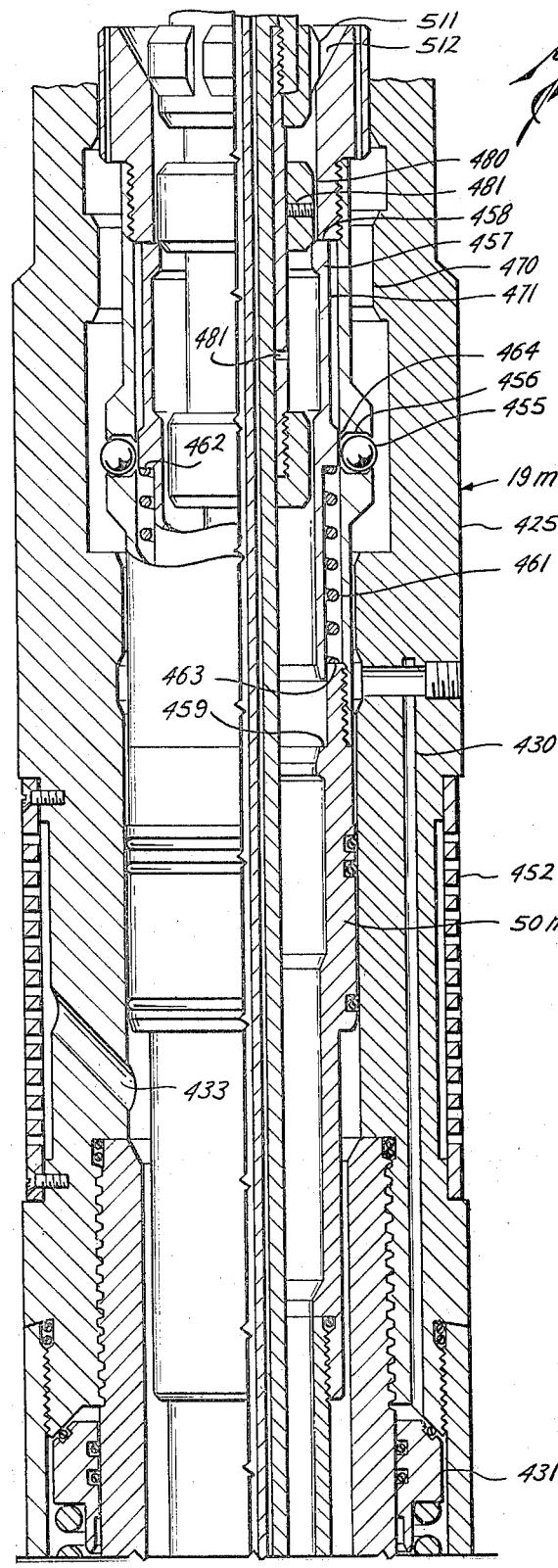
Figure 27:
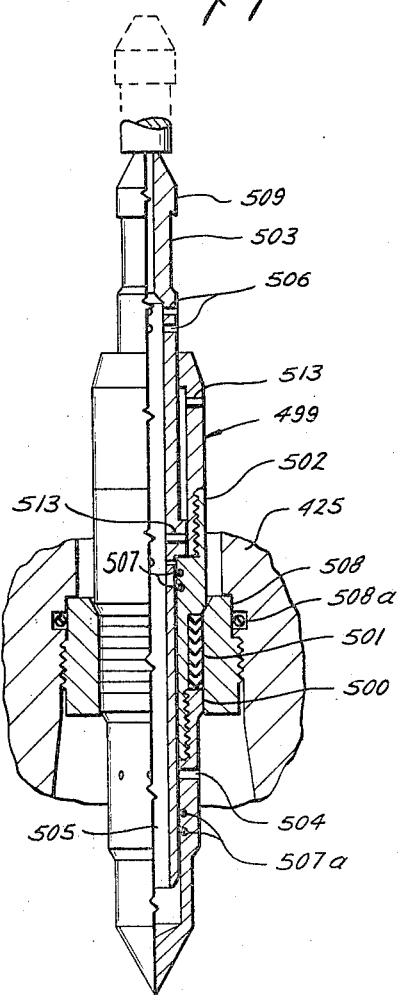

FIG. 13 is a simplified view, in longitudinal section, of the packer assembly portion and the retrievable portion of a still further embodiment of a well tool in accordance with the invention;

FIG. 14 is a fragmentary view of the upper portion of the packer assembly shown in FIG. 13, and showing a portion of a modified retrievable assembly for use when taking the final fluid sample from a specific test zone;

FIG. 15 is a schematic diagram of another embodiment of the invention showing the packer assembly portion of a well tool attached to a string of drill pipe within a bore hole and showing the retrievable portion of the tool being lowered through the bore of the pipe string;

FIG. 16 is a simplified view, in longitudinal section, of an embodiment of the packer assembly portion of a well tool for use in testing and treating operations during drilling;

FIG. 17 is a transverse sectional view taken along the line 17—17 of FIG. 16;

FIG. 18 is a transverse sectional view taken along the line 18—18 of FIG. 16;

FIG. 19 is a further longitudinal view, partially in section, of the retrievable portion of the apparatus of FIG. 15 and a detachable barrier valve member;

FIG. 20 is a further view, partly in longitudinal section, of the apparatus illustrated in FIGS. 16 and 19 showing parts of the tool in the positions normally occupied when successive fluid samples are being taken from a test zone;

FIG. 21 is a view, partly in longitudinal section, showing the apparatus of FIG. 20 with the parts in the positions normally occupied when the shut-in pressure is being recorded;

FIG. 22 is a view, in longitudinal section, showing the apparatus of FIG. 20 after a sample has been retrieved and the barrier valve member is seated in the body of the tool;

FIG. 23 is a view, in longitudinal section, showing a retrievable assembly for use in releasing the packer and retrieving the barrier valve member after the final operation at a specific zone, FIG. 24 is a simplified view, in longitudinal section, of the packer assembly portion of another embodiment of the invention;

FIG. 25 is a view, partly in longitudinal section, of the apparatus of FIG. 24 showing a retrievable assembly seated within the packer assembly;

FIG. 26 is a fragmentary view of the upper portion of the packer assembly of FIG. 24 and a portion of a retrievable assembly for taking successive samples from a single zone;

FIG. 27 is a view, shown partly in longitudinal section, of the detachable valve member portion of the apparatus shown in FIG. 25;

FIG. 28 is a fragmentary view, in longitudinal section, of the apparatus of FIG. 25 with the parts in the position normally occupied when shut-in pressure is being recorded;

FIG. 29 is a simplified view, in longitudinal section of the packer assembly portion of the apparatus of FIG. 25 after the retrievable assembly has been removed from its seat in the body and the barrier valve member is seated in the body of the tool;

FIG. 30 is a simplified view in longitudinal section of the lower portion of the packer assembly of FIG. 24 and showing the lower portion of a retrievable assembly for use in releasing the packer and retrieving the barrier valve member after the final operation at a specific zone in the well is completed;

FIG. 31 is a fragmentary view, shown partly in longitudinal section, of the upper portion of the packer assembly of FIG. 26 and showing the upper portion of a retrievable assembly for taking successive samples;

FIG. 32 is a fragmentary view, shown partly in longitudinal section, of the upper portion of the packer assembly of FIG. 24 and showing the upper portion of a retrievable assembly for releasing the packer after the final operation at a specific zone;

FIG. 33 is a fragmentary view, shown partly in longitudinal section, of the portions of apparatus shown in FIG. 32 and showing the parts in the position normally occupied when the retrievable assembly is seated in the packer assembly; and FIG. 34 is a fragmentary sectional view of the upper portion of a modified form of retrievable valve assembly adapted for introducing fluids into a zone in the well bore.

Referring now to the drawings, in FIG. 1 there is illustrated a borehole 10 drilled through earth formations and filled with a drilling fluid 11. A pipe string 12 is suspended from the floor of a drilling platform 13 by means of tapered slips 14 and may be raised or lowered in the well bore by means of conventional apparatus (not shown). A fluid pump 15 has an intake conduit 16 submerged within a drilling fluid reservoir 17 and an outlet conduit 18 connected to the bore of the pipe string 12. Thus, fluid pressure may be applied within the pipe string 12 to circulate the drilling fluid in a conventional manner or to operate the well tool, as will be described hereinafter.

In one embodiment of the invention, the well tool comprises a packer assembly 19, which is adapted to be connected to the pipe string 12 for positioning at any desired level within the well bore, and a retrievable assembly 20, which is adapted to be raised or lowered within the pipe string 12 by means of a wire line 21 spooled upon, and driven by, a power winch 22. At the lower end of the packer assembly 19, there may be attached a perforated plug 23 which facilitates entry of the packer assembly into the well bore 10 and allows circulation of drilling fluid through the pipe string. A pressure lubricator device 24 permits entry of wire line 21 into the bore of the pipe string without loss of fluid pressure which may be applied therein.

To assist in understanding the invention, a simplified description of the structure and operation of one embodiment will first be given with reference to FIGS. 2, 3, 4 and 5. The FIGS. 2–5 embodiment will then be described in further aspects and detail with reference to FIGS. 6A through 6E, 7 and 8. Further embodiments and modifications of the invention will then be described with reference to FIGS. 9 through 34.

The following description of the packer assembly 19 may best be understood with reference to FIG. 2. The packer assembly 19 includes a tubular body member 30 which may have its upper end adapted for threaded, fluid-tight connection to a pipe string (not shown) and its lower end adapted for threaded connection to a perforated plug (not shown). A pair of annular, pliable, expansible packers 31 and 32 are supported about the exterior of the body member 30 and separated by a spacer sleeve 33 which is slidably fitted about the body member to accommodate changes in packer length. The upper end of upper packer 31 is connected to body member 30 and the lower end of lower packer 32 is connected to a hydraulic return sleeve 34 which is slidably received about the body member. Return sleeve 34 and body member 30 have interengaging stepped surfaces which define a sealed hydraulic packer return chamber 35, as best seen in FIG. 4.

Annular spaces 36 and 37 between each of the packers 31 and 32 and the body member 30 are connected via a passage 38 through the spacer sleeve 33 and together form a sealed packer inflating chamber. The upper end of the inflating chamber 36–38 is connected to the bore of body member 30 by means of an inflating passage 39, and a check valve 40 permits entry of fluids from the bore of the body member into the inflating chamber but prevents fluid flow in the opposite direction. A deflating passage 41 through the body member 30 allows fluids trapped within the inflating chamber 36–38 to be exhausted into the bore of the body member.

An equalizing passage 42 and a test passage 43 extend through body member 30 and spacer sleeve 33 and are each appropriately sealed to provide separate fluid channels between the bore of the body member and the portion of the well bore adjacent the spacer sleeve. A check valve 44 may be located in test passage 43 to permit entry of fluids from the well bore but prevent fluid flow in the opposite direction.

A tubular sleeve member 50 slidably mounted for limited longitudinal movement within the bore of body member 30 functions as a valve means for various passages in the body member by the location of various passages through the sleeve member. Body member 30 has a bore of generally uniform diameter to receive and seal with the retrievable assembly 20. The sleeve 50 is provided with a test and equalizing passage 51, a deflating passage 52, and a series of O-rings which cooperate to valve selectively the deflating, equalizing and test passages 41, 42 and 43. Downward and upward movement of sleeve member 50 is limited by interengagement of shoulders 53, 54 and 55, 56 located at the upper and lower portions, respectively, of the sleeve member 50 and body member 30. A spring 57 acts in compression between shoulders 58 and 59, located on body member 30 and sleeve member 50, respectively, to urge the sleeve toward its uppermost position; and a resiliently expansible snap ring 60 is mounted in the bore of the body member to releasably lock the sleeve member in its lowermost position and to releasably retain the sleeve in its uppermost position.

When the sleeve member 50 is in its uppermost position, its test and equalizing passage 51 registers in sealed communication with the body member equalizing passage 42, and its deflating passage 52 registers with the body member deflating passage 41. In the lowermost position of the sleeve member 50, the body member equalizing passage 42 and deflating passage 41 are closed by O-rings, and the sleeve member test and equalizing passage 51 registers in sealed communication with the body member test passage 43.

Continuous pressure equalization between the portions of the well bore above and below the packer devices 31 and 32 is provided by a pressure by-pass passage 64, which comprises a lateral passage 65 through the upper end of body member 30, a sealed annular space 66 is defined by the upper portions of the body member bore and periphery of sleeve member 50 and extending past shoulder 53, a longitudinal passage 67 through the central portion of the body member, the sleeve member deflating passage 52, the lower bore of the body member, and the perforated plug 23. By-pass passage 64 also permits circulation of drilling fluid when the packers devices are expanded except when the retrievable assembly 20 is seated in the sleeve member 30.

The retrievable assembly 20, shown in seated position within the packer assembly 19 in FIGS. 3 and 4, comprises a sampler valve section 70 which may be slidably received within the bore of sleeve member 50 and a sample chamber section 71 which is connected to the upper end of valve section 70. A wire line 21 may be attached in a conventional manner to the upper end of the sample chamber section 71 to raise or lower the rerievable assembly 20 within the bore of the pipe string 12.

The sampler valve section 70 comprises two telescopically arranged members, an outer valve sleeve 72 and an inner valve mandrel 73, which have interengaging surfaces at their lower end to limit relative movement between an extended position (FIG. 3) and a retracted position (FIG. 4). A tapered shoulder 74 at the upper end of the valve sleeve 72 interengages with a tapered shoulder 75 at the upper end of the sleeve member 50 to support the retrievable assembly 20 in a seated position within the bore of the sleeve. A spring 76 acts in compression between valve sleeve 72 and mandrel 73 to urge them toward their extended position.

When the retrievable assembly 20 is in its seated position within the bore of the sleeve member 50 (FIGS. 3 and 4), the bore of the packer assembly 19 is closed to downward fluid flow by O-rings 80, 81 and 82, which seal between the body member 30, sleeve 50, sampler valve sleeve 72, and sampler valve mandrel 73, respectively; and fluid pressure applied by means of pump 15 to the bore of pipe string 12 will act upon valve mandrel 73 to urge it downwardly against the force of spring 76. The weight of the sampler valve mandrel 73 and the sample chamber section 71, the diameter of the valve mandrel, and the spring rate of the sampler valve spring 76 are so chosen that the valve mandrel will be moved to its retracted position whenever a predetermined pump pressure is applied. The upper side of the upper O-ring 82 around the sampler valve mandrel 73 is exposed to the hydrostatic pressure within the bore of the pipe string 12 and the lower face of the lower O-ring 83 around the valve mandrel is exposed to the hydrostatic pressure in the annulus between the well walls and the pipe string via the pressure by-pass passage 64 (even when the packers 31 and 32 are set) and the ports 84 located in the lower end of the mandrel 73 valve sleeve 72. Therefore, the valve mandrel 73 is pressure-balanced within the halve sleeve 72 insofar as the hydrostatic head of the drilling fluid is concerned when the same hydrostatic head exists within and outside the pipe string.

The interior of the valve mandrel 73 is divided into two separate compartments 90 and 91 by a bore-closing portion 92 near the lower end of the mandrel. The upper compartment 90 forms a sample-receiving conduit which opens into the sample chamber section 71 and the lower compartment 91 forms a closed shut-in pressure chamber. Conventional time-pressure recorders 93 and 94 are mounted in each of shut-in pressure chamber 91 and sample chamber section 71, respectively.

Valve means are provided for placing selectively either the shut-in pressure chamber 91 or both the shut-in pressure chamber and the sample-receiving conduit 90 in fluid communication with the sleeve member test and equalizing passage 51. The valve means comprises a pair of longitudinally spaced passages 95 and 96 through the sampler valve sleeve 72 and a pair of longitudinally spaced passages 97 and 98 through the valve mandrel 73. The passages 95, 96 and 97, 98 are so positioned and spaced that, in the extended position of mandrel 73 relative to sleeve 72 (FIG. 3), the lower passage 98 through the mandrel registers with the upper passage 95 through the sleeve 72 and only the shut-in pressure chamber 91 is in fluid communication with the sleeve member test and equalizing passage 51; whereas, in the retracted position of the mandrel relative to the sleeve 72 (FIG. 4), both the upper and lower passages 97 and 98 through the mandrel register with the upper and lower passages 95 and 96; respectively, through the sleeve 72. Fluid communication is thereby provided from the sleeve member test and equalizing passage 51 to both the sample receiving conduit 90 and the shut-in pressure chamber 91.

The sample chamber section 71 of the retrievable assembly 20 may comprise a plurality of series-connected sample-receiving chambers, though only two such chambers 100 and 101 are shown in FIG. 4. A back pressure or check valve 102 is placed in the passage 103 between the adjacent chambers 100, 101 and is arranged to permit entry of fluids from the sample-receiving conduit 90 but to prevent fluid flow in the opposite direction.

In FIG. 5 there is shown a portion of a modified retrievable assembly 20′ for use when taking the final fluid sample from a specific test zone. Modified assembly 20′ is identical in all respects with retrievable assembly 20 (FIGS. 3 and 4) except that in the modified version, the upper portion of sampler valve sleeve 72′ is enlarged in diameter and a snap ring 110 is disposed in a peripheral groove formed in the outer surface of the sampler valve sleeve 72′. The enlarged-diameter portion of the sleeve 72′ and the snap ring 110 function to release the sleeve member 50 from its locked lowermost position in a manner to be described hereinafter.

To perform testing operations within a well bore, the packer assembly 19 is connected at the end of a pipe string 12 with the assembly being in the position shown in FIG. 2. The pipe string 12 is then lowered into the well bore 10 until the packer assembly 19 is positioned opposite the zone to be tested, as for example, zone 26 shown in FIG. 1. During the lowering operation the bore of the pipe string 12 fills with drilling fluid 11 which enters through the perforated plug 23. Thus, at any time during the lowering operation, drilling fluid 11 may be pumped downwardly through the bores of the pipe string 12 and packer assembly 19 and out of the perforated plug 23 to return to the surface via the annulus between the pipe string and the well wall. The sleeve member spring 57 and the snap ring 60 hold the sleeve member 50 in its uppermost position so that the equalizing passages 42, 51 and the deflating passages 41, 52 are open.

When the packer assembly 19 is positioned opposite the test zone 26, the retrievable assembly 20 shown in FIGS. 3 and 4 may be lowered through the bore of the pipe string 12 to its seated position within the packer assembly. After the sampler valve sleeve shoulder 74 lands on the sleeve member shoulder 75, the weight of the retrievable assembly 20 compresses the sleeve member spring 57 and moves the sleeve member 50 downwardly to its lowermost position. The parts of the well tool will then be in the positions shown in FIG. 3, with the equalizing passage 42 and the body deflating passage 41 being closed and the test passage 43 in fluid communication with the shut-in pressure chamber 91 via sleeve member passage 51 and sampler valve assembly passages 95 and 98.

The pressure lubricator device 24 (shown in FIG. 1) may then be closed and fluid pressure applied to the pipe string 12 by means of pump 15. Since the bore of the packer assembly 19 is now closed, the fluid pressure within the pipe string 12 forces fluid through the inflating check valve 40 and into the inflating chamber 36–38 to expand packers 31, 32 into sealed engagement with the well wall, as shown in FIG. 4. As previously mentioned, the sampler valve mandrel 73 remains in its extended position relative to sampler valve sleeve 72 until the pump pressure within the pipe string 12 is further increased to a predetermined value which may, for example, be 750 p.s.i.g. The predetermined value chosen should be sufficiently high that the pressure within the packers 31 and 32 will support the pressure differential across their ends when the test zone 26 is opened to the atmospheric pressure within chambers 100, 101 of retrievable assembly 20.

As the pump pressure is increased above the predetermined value, the sampler valve mandrel 73 is moved downwardly to its retracted position relative to the sampler valve sleeve 72, thereby moving mandrel passage 97 into registry with sleeve passage 95 and placing the sample-receiving conduit 90 in fluid communication with the surrounding formation test zone 26 via passages 97, 95, 51 and 43, as shown in FIG. 4. The shut-in pressure chamber 91 remains in fluid comunication with the test zone 26 via passages 98, 96, 51 and 43.

As the sample-receiving chambers 100, 101 are filled with test fluids, check valve 102 functions to substantially segregate the produced fluids according to their order of production. If desired, however, check valve 102 may be replaced by a choke orifice.

After sufficient time has elapsed for reception of the fluid sample into the sample-receiving chambers 100, 101, the pump pressure is released from the bore of the pipe string 12 leaving only hydrostatic pressure which allows the sampler valve spring 76 to return the sampler valve mandrel 73 to its extended position. Thus, passage 97 is closed to entrap the received fluid sample within the sample-receiving chambers 100, 101. The retrievable assembly 20 then may be lifted to the surface by means of wire line 21 and the entrapped fluid sample examined and analyzed.

When the retrievable assembly 20 is removed from packer assembly 19, snap ring 60 holds the sleeve member 50 in its lowermost position. Drilling fluid may be circulated through the base of pipe string 12, by-pass 66, and the annulus around pipe string 12. The equalizing passage 42 and the deflating passage 41 therefore remain closed. The expanding check valve 40 prevents escape of the fluid trapped in the expanding chamber 36–38 to maintain the packers 31 and 32 in sealed engagement with the well wall. The check valve 44 located in the packer assembly test passage 43 prevents entry of drilling fluid 11 from the bore of the pipe string 12 into the portion of the well bore 10 located between the expanded packers 31 and 32 so that the test zone 26 remains isolated from drilling fluid pressure and contamination while the retrievable assembly 20 is being withdrawn to the surface.

The same or another retrievable assembly 20 may then be lowered through the pipe string 12 and a second fluid sample may be taken. This procedure may be repeated as many times as desired until a satisfactory fluid or pressure analysis of the test zone has been made.

For the final sample-taking operation from sealed-off test zone 26, the retrievable assembly 20′ having a modified sampler valve sleeve 72′, as shown in FIG. 5, is lowered into seated position within packer assembly 19. Pump pressure is again applied and a fluid sample taken in the manner previously described. When modified retrievable assembly 20′ is lifted from its seated position within packer assembly 19, the enlarged-diameter portion of the sampler valve sleeve 72′ holds snap ring 60 in its expanded condition until the upper end of the sleeve member 50 has moved into a position opposite the snap ring. The snap ring 110 carried by the modified sampler valve sleeve 72′ transmits the force of the upward movement of the sampler valve sleeve 72′ to the sleeve member 50 and assists spring 57 in moving the sleeve member 50 upwardly. Thus, when the modified retrievable assembly 20′ is removed from the packer assembly 19, the sleeve member 50 is returned to its uppermost position as shown in FIG. 2. This upward movement of the sleeve member 50 opens the deflating passage 41 and relieves the fluid pressure from the packer inflating chamber 36–38. At the same time, the equalizing passage 42 is opened to allow hydrostatic pressure to return to the portion of the well bore between packers 31 and 32, thereby facilitating deflation of the packers. The packer return chamber 35 aids in returning packers 31 and 32 to their deflated condition. When the packers 31 and 32 are deflated, return sleeve 34 is pulled upwardly, thus increasing the volume of vacuum chamber 35. Since the chamber 35 is sealed, the pressure within it is extremely low and the high hydrostatic fluid pressure outside the chamber tends to urge the return sleeve 34 back toward its lower position, as shown in FIG. 3. In this manner, full collapse of the deflated packers 31 and 32 is ensured.

The packer assembly 19 may then be moved upwardly or downwardly in the borehole 10 to be positioned opposite another test zone, whereupon further sample-taking operations may be repeated in the manner previously described.

During a sample-taking operation, the formation shut-in pressure may be measured by one of two methods, the first method utilizing the upper and lower pressure recorders 93, 94 and the second method utilizing the lower pressure recorder 93 alone. By the first method, the sampler valve assembly 70 is maintained in its retracted condition (FIG. 4) until the sample-receiving chambers are filled whereupon the pressure recorders 93, 94 measure the formation shut-in pressure. However, it may not be possible to use this method in all cases. For example, if the test zone is relatively impermeable, an excessive amount of time may be required to fill the sample-receiving chambers or, as previously mentioned, the pressure in the formation immediate to the well bore may decrease during the flow period and may not be restored to the true formation pressure within a reasonable period of time. Under such conditions, the second method of measuring pressure utilizing only pressure recorder 93 may be employed.

In accordance with this second method of measuring pressure, the pump pressure in the bore of the pipe string is raised momentarily above the predetermined value to allow the test zone to flow for a short period of time into the sample-receiving chambers 100, 101 in order to relieve the hydrostatic drilling fluid pressure and the packer squeeze pressure trapped between packers 31 and 32. Due to the relatively small volume of the annulus that is isolated by the packers 31 and 32, only a few seconds of flow should be required to relieve these pressures. The pump pressure is then reduced so that the sampler valve assembly 70 may return to its extended condition (FIG. 3) and terminate the flow period. If the formation fluids are allowed to flow into the sample-receiving chambers 100, 101 for only a short period of time, then the formation pressure near the well bore will not have decreased materially and the lower pressure recorder 93 will record the true or initial shut-in pressure. The pump pressure may then be raised above the predetermined value to move the sampler valve assembly 70 to its retracted condition (FIG. 4) so as to complete the flow test and, in many instances, to obtain a record of final shut-in pressure, as well. Since only a simple change in pump pressure is required to operate the sampler valve assembly 70, the flow test may be interrupted at any time and a remeasurement of the shut-in pressure made.

The pressure recorder 94 located in the sample receiving chamber 100 will record all pressures in the chamber during the sample-taking operation and will therefor provide a measure of the formation flow pressure.

The embodiment of FIGS. 2–5 is next described in further aspects and detail with reference to FIGS. 6A–6E, 7 and 8. FIGS. 6A–6E show the parts of the tool in the positions normally occupied when a fluid sample is being taken as illustrated in FIG. 4.

Referring now to FIGS. 6A–6E, there is shown a body member 30 which comprises a plurality of threadedly connected tubular elements 30a, 30b, 30c, 30d and 30e. The upper element 30a has a threaded connection at its upper end to the pipe string 12 and the lower element 30e is adapted for connection at its lower end to the perforated plug 23 (see FIG. 1).

The upper inflatable packer 31 and the lower inflatable packer 32 each comprise a plurality of concentric, flexible reinforcing tubes 120 and 121 constructed, for example, of braided steel wire or cable and inner and outer inflatable tubes 122 and 123 of a relatively impermeable and pliable material, for example, neoprene rubber. Braided reinforcing tubes 120, 121 are preferably sandwiched between inflatable tubes 122 and 123.

The upper end of upper packer 31 has an end fitting 124 which is threadedly connected to the upper element 30a of the body member. The lower end of upper packer 31 and the upper end of lower packer 32 have end fittings 125 and 126 which are threadedly connected to the upper and lower ends, respectively, of the spacer sleeve 33. And, the lower end of lower packer 32 has an end fitting 127 thradedly connected to packer return sleeve 34 which is slidably received about the cylindrical outer surface of body members elements 30d and 30e for longitudinal movement to accommodate changes in length of packers 31 and 32 as they are inflated or deflated.

Body member elements 30d and 30e and packer return sleeve 34 define external and internal shoulders 129 and 130, respectively, which interengage when packers 31 and 32 are deflated and which are spaced to define a hydraulic packer return chamber 35 when the packers are inflated. O-rings 132 and 133 carried by return sleeve 34 and body member element 30e, respectively, seal the packer return chamber 35. A slot 134 and a lateral passage 135 provide fluid communication between return chamber 35 and the well bore 10. A check valve 136 in passage 135 prevents entry of fluids from the well bore 10 into the chamber 35 but allows fluids to be exhausted from the chamber 35 into the well bore.

Since the end fittings 124–127 are identical in structural detail, only the upper end fitting 124 of the upper packer 31 is next described. The end fitting 124 comprises an outer anchor sleeve 140, which has a threaded connection to the upper element 30a of the body member, and an inner anchor sleeve 141. External flange 142 formed about the inner anchor sleeve 141 interengages with a internal flange 143 formed within the outer anchor sleeve 140 to position or lock the two sleeves together. The internal diameter of outer anchor sleeve 140 is greater than the external diameter of inner anchor sleeve 141 to define an annular space which receives the ends of the reinforcing tubes 120 and 121 of the packer 31. Tubes 120 and 121 are anchored within the annular space by means of an epoxy resin 144 or a similar material which has high temperature resistance and great mechanical strength. The surfaces of the outer and inner anchor sleeves 140, 141 may be grooved or roughened to further add to the composite shear strength of the end fitting 124.

A retainer ring 145 having a relatively high hoop strength is threadedly connected to the lower end of outer anchor sleeve 140 to prevent "belling" of the end fitting 124 under the mechanical stresses applied when the packers 31 and 32 are expanded. The lower internal edge of retainer ring 145 is rounded to prevent sharp bending of reinforcing tubes 120 and 121.

The upper end of the outer inflatable tube 123 may be bonded directly to the lower end of retainer ring 145. The end of the inner inflatable tube 122 extends upwardly within the inner anchor sleeve 141 and has an upper portion which is folded outwardly and downwardly over the upper end of the inner anchor sleeve and secured with a clamping ring 146 to form a fluid-tight seal. The internal diameter of the inner inflatable tube 122 is slightly greater than the external diameter of body member element 30b to provide an annular clearance allowing fluid communication between body member element 30b and end fitting 124. If desired, a metal sleeve (not shown) may be fitted within the upper end of inflatable tube 122 to maintain such clearance.

Annular spaces 36 and 37 formed between each of the packers 31 and 32 and the body member 30 are connected via longitudinal passage 38 through the spacer sleeve 33 and together are sealed to provide an inflating chamber 36–38 which is closed by O-ring 132 carried by the packer return sleeve 34, by O-rings 152 and 153 carried by the spacer sleeve 33, and by the fluid tight connection between end fitting 124 and body member element 30a.

An equalizing passage 42 and a test passage 43 extend through the spacer sleeve 33 and body member element 30c to provide separate fluid channels between the bore of the body member 30 and the portion of the borehole 10 thereabout located between packers 31 and 32. The equalizing passage 42 comprises a passage 42a extending laterally through the spacer sleeve 33 to an annular recess 42b in the bore of the spacer sleeve, which in turn communicates with a passage 42c through the body member 30c. The test passage 43 similarly comprises a passage 43a through the spacer sleeve 33 which communicates with an annular recess 43b in the bore of the spacer sleeve, which in turn communicates with a passage 43c through body member element 30c. Annular recesses 42b and 43b are of sufficient longitudinal extent that the spacer sleeve 33 may move upwardly or downwardly to accommodate changes in length of packer 31 without destroying fluid communication between the respective equalizing and test passages in the body member element 30c and the spacer sleeve 33. O-rings 152, 153 and 154 provide sliding fluid seals between the spacer sleeve 33 and body member element 30c, respectively, to separate the upper portion 36 of the packer inflating chamber 36–38, the equalizing passage 42, the test passage 43, and the lower portion 37 of the packer inflating chamber. A check valve 44 located in the spacer sleeve test passage 43a permits entry of fluids from the well bore 10 but prevents fluid flow in the opposite direction.

A deflating passage 41 through body member element 30c near the upper end of annular chamber 37 provides a means for fluids trapped within the inflating chamber 36–38 to be exhausted into the bore of the body member. Deflating passage 41 may be selectively opened or closed in a manner to be described hereinafter. An emergency deflating passage 155 through body member element 30c near the lower end of annular space 151 provides an alternate means for performing the same function. Emergency deflating passage 155 is normally closed and sealed by a slidable valving sleeve 156 which carries O-rings 157 and 158. The valving sleeve 156 carries a snap ring 159 which interengages with an annular groove 160 in the bore of body member 30d to hold the valving sleeve in position opposite emergency deflating passage 155. In the event that the normal means for opening deflating passage 41 should become inoperative, the packers 31 and 32 may be deflated by moving valving sleeve 156 downward in the bore of body member 30. This may be accomplished by dropping or lowering through the bore of the pipe string a simple weighted mandrel having a diameter greater than the internal diameter of valving sleeve 156.

Equalizing passage 42, test passage 43, and deflating passage 41 are selectively opened and closed by means of the tubular sleeve member 50 which is slidably mounted for limited longitudinal movement within the bore of the body member 30 and which comprises a plurality of threadedly connected tubular elements 50a, 50b and 50c. Downward movement of the sleeve member 50 is limited by interengagement of an upwardly facing shoulder 54 formed by the upper end of body member element 30c and a downwardly facing shoulder 53 formed by the lower end of sleeve member element 50a. A plurality of slots 165 are formed about the lower external periphery of sleeve member element 50a to permit fluid communication through the annulus between sleeve member 50 and body member 30 when shoulders 53 and 54 are in contact. Upward movement of sleeve member 50 is similarly limited by interengagement of an upwardly facing shoulder 56 formed by the upper end of sleeve member element 50c and a downwardly facing shoulder 55 formed by the lower end of body member element 30c.

The sleeve member 50 is urged toward its uppermost position by spring 57 which acts in compression between an upwardly facing shoulder 58 formed in the bore of body member element 30d and a downwardly facing shoulder 59 formed by an enlarged-diameter portion 166 of sleeve member element 50c.

The sleeve member 50 may be releasably locked in its lowermost position by means of snap ring 60 which is carried within an annular groove 167 formed within the bore of body member element 30a and which is held in position within groove 167 by a retainer ring 168. The internal diameter of snap ring 60 in its unstressed condition is less than the external diameter of the upper end of sleeve member 50; and annular groove 167 is so located that, when the sleeve member is depressed to its lowermost position, the lower surface of the snap ring clears the upper end of the sleeve member and therefore may contract to prevent return of the sleeve member to its uppermost position.

To selectively open and close the equalizing passage 42, the test passage 43, and the deflating passage 41, central element 50b of the sleeve member 50 is provided with a series of O-rings and lateral passages. O-rings 170 and 171 are carried by an enlarged-diameter portion 172 of sleeve member element 50b which is slidably received in the bore of body member element 30c. O-rings 173 and 174 are carried about an enlarged-diameter portion 175 of sleeve member element 50b which is also slidably received within the bore of body member element 30c. Test and equalizing passage 51 is located between enlarged-diameter portions 172 and 175 and deflating passage 52 is located below enlarged portion 175. When the sleeve member 50 is in its uppermost position, its test and equalizing passage 51 registers with the body member equalizing passage 42 and its deflating passage 52 registers with the body member deflating passage 41. In the lowermost position of the sleeve member 50, O-rings 170 and 171 close the equalizing passage 42, the test and equalizing passage 51 is in register with the body member test passage 43, and O-rings 173 and 174 close the body member deflating passage 41.

Pressure by-pass passage 64 provides continuous fluid communication between the portions of the borehole 10 located above packer 31 and below packer 32. As part of by-pass passage 64, lateral passage 65 through body member element 30a connects annular space 66, defined by the bore of body member element 30b and the exterior of sleeve member 50, with screened outlet port 65a. A port 67a connects space 66 with passage 67 (FIG. 6D) which extends longitudinally through the central portion of the body member element 30c; thence, the sleeve member deflating passage 52 extends the by-pass passage 64 from the annular space between body member element 30d and sleeve member 50 and below O-ring 174 to the lower portion of the bore of the body member element 30e, and to the perforated plug 23. Annular space 66 is sealed at its lower end by O-ring 170 carried by the sleeve member 50 and at its upper end by an O-ring 176 carried in a groove of an enlarged-diameter portion 177 of the sleeve member 50.

The sampler valve section 70 of retrievable assembly 20 comprises two telescopically arranged members, a valve sleeve 72 and a tubular valve mandrel 73. The sampler valve sleeve 72 comprises a plurality of threadedly connected tubular elements 72a, 72b, 72c and 72d closed at its lower end by bottom closure element 72e; and sampler valve mandrel 73 comprises threadedly connected tubular elements 73a and 73b. The bore of valve mandrel 73 is closed at its lower end by a plug 179 which screws into the lower end of mandrel element 73b.

An upwardly-facing, external shoulder 180 formed by an enlarged-diameter portion at the bottom end of mandrel element 73b (FIG. 6D) interengages with an internal shoulder 181 formed by the lower end of a sleeve element 72c to limit upward movement of mandrel 73 at an extended position of the mandrel relative to sleeve 72. Downward movement of mandrel 73 at a retracted position relative to valve sleeve 72 is limited by contact between plug 179 in the bottom of mandrel 73 and an upstanding elongated cylindrical stop member 182 which is formed on the upper end of sleeve closure element 72e and which projects upwardly into the bore of sleeve element 72d. The diameter of stop member 182 is less than the internal diameter of sleeve member 72b to form an annular space which receives a spring 76. Sampler valve spring 76 acts in compression between the bottom of mandrel element 73b and a shoulder 184 on sleeve closure element 72e to urge the mandrel 73 toward its extended position relative to the sleeve 72.

The retrievable assembly 20 is supported in a seated position within the bore of sleeve member 50 by interengagement of external tapered shoulder 74 (FIG. 6C) formed at the upper end of the sampler valve sleeve element 72a with internal tapered shoulder 75 formed at the upper end of sleeve member element 50a.

Sampler valve sleeve element 72c (FIG. 6D) is provided with enlarged-diameter portions 185 and 186 fitted within the bore of sleeve member element 50b and carrying O-rings 187 and 188, respectively, to provide sliding fluid seals. When the retrievable assembly 20 is in its seated position within sleeve member 50, the seals carried by enlarged-diameter portions 185 and 186 are positioned, respectively, above and below the sleeve member test-and-equalizing passage 51.

The sample chamber section 71 of retrievable assembly 20 comprises a plurality of tubular elements 200, 201, 202 and 203 connected by tubular couplings 204, 205 and 206 (FIGS. 6A and 6B). Chamber section 71 is attached to the upper end of sampler valve section 70 by means of a tubular coupling 207 which threadedly connects the lowermost tubular element 203 to the top sampler valve mandrel element 73a and which provides fluid communication between the bore of the sampler valve mandrel 73 and the sample chamber section 71. Uppermost tubular element 200 is threadedly connected at its upper end to a combination fishing head 208 to which wire line 21 is attached for raising or lowering the retrievable assembly 20 within the bore of the pipe string 12.

Back-pressure valves 102a, 102b and 102c, which may be fitted in the bores of couplings 204, 205 and 206, respectively, permit fluid flow only in an upward direction and separate the interior of the sample chamber section 71 into a plurality of chambers 100, 100a, 101 and 209. Sample chambers 100, 100a and 101 function to receive and contain the formation fluid sample and chamber 101 additionally contains a conventional time-pressure recorder 94. Recorder 94 is mounted in a container 210 which screws into the lower bore of coupling 205. The external diameter of container 210 is less than the internal diameter of tubular element 202 and the container is provided with ports 211 to provide a channel for fluid flow upwardly through the sample chamber section 71. It is noted that additional sample chambers may be added to section 71 by the simple addition of tubular elements, couplings and back-pressure valves between the tubular element 200 and plug 208. A passage 225 in plug 208 opens into sample chamber 100 and is provided with a relief valve 226. Valve 226 may be operated manually at the surface after recovery of a sample to relieve the pressure introduced into the sample chambers during the testing operation.

Sample chamber 209 and the connected bore of sampler valve mandrel 73 are divided into a shut-in pressure chamber 91 and a sample-receiving conduit 90 (as illustrated in simplified form in FIG. 4) by means of a partitioned container 212 and a tubular pressure-transfer tube 213. Container 212 screws into the lower bore of coupling 206 and is provided with upper and lower interior bore portions separated by a partition 214. The lower interior portion of container 212 carries the pressure recorder 93. A hanger nipple 215 is threadedly connected to the lower end of container 212 and is provided with a bore 216 to slidably receive pressure-transfer tube 213. O-rings 217 provide a fluid seal between bore 216 and transfer tube 213. A collar 218 screwed to the upper end of transfer tube 213 interengages with a shoulder 219 formed on the interior of hanger nipple 215 to couple tube 213 and nipple 215 together. The external diameter of container 212 is less than the internal diameter of tubular element 203 to provide an annular space therebetween.

Pressure-transfer tube 213 extends downwardly through the bore of sampler valve mandrel 73 and is slidably received by a reduced bore portion 220 formed within mandrel element 73b. O-ring 221 carried by reduced bore portion 220 provides a sliding fluid seal between transfer tube 213 and mandrel 73.

The external diameter of transfer tube 213 is less than the internal diameter of mandrel 73 to define an annular space 222 above reduced bore portion 220 and an annular space 223 below reduced bore portion 220. Thus, shut-in pressure chamber 91 comprises annual space 223, the bore of pressure-transfer tube 213 and the lower interior portion of container 212; and sample-receiving conduit 90 comprises annular space 222 and the portion of chamber 209 external of transfer tube 213, hanger nipple 215 and container 212. Passages 224 through the wall of container 212 and located above partition 214 provide fluid communication between sample-receiving conduit 90 and the upper interior portion of container 212, which in turn communicates with sample chambers 101, 100 and 100a via the bore of coupling 206 and back-pressure valve 102c.

Sampler valve mandrel element 73b is provided with lateral passages 97 and 98 which open into annular spaces 222 and 223 respectively; and sampler valve sleeve element 72c is provided with lateral passages 95 and 96 located between enlarged-diameter portions 185 and 186. Passages 95, 96, 97 and 98 are sealed with respect to the space between mandrel 73 and sleeve 72 by O-rings 82 and 83 carried by mandrel element 73b. O-rings 225, carried by mandrel element 73b, are arranged to be located between passage 95 and passage 97 in the extended condition of sampler valve section 70 to seal sample-receiving conduit 90 from fluid communication with the test zone.

Due to the use of cross-sectional views in illustrating the invention, the various passages provided throughout the tool have been described heretofore in the singular. It will be understood, however, that each of such passages may consist of a plurality of individual passages radially spaced about the element through which such passage extends. This is illustrated in FIG. 7 which is a transverse cross-sectional view of the entire well tool drawn through spacer sleeve and body member test passage 43, sleeve member test and equalizing passage 51, sampler valve section passages 96 and 98, body member passage 67, and spacer sleeve passage 38.

FIG. 8 illustrates in further detail the modified retrievable assembly 20′, shown in simplified form in FIG. 5, for use when taking the final fluid sample from a specific test zone. The upper end of modified sampler valve sleeve 72′ has a portion 230 having a diameter slightly greater than the upper end of sleeve member 50. When modified retrievable assembly 20' is lowered into its seated position within sleeve member 50, portion 230 will move snap ring 60 to its fully expanded condition. A substantial part of portion 230 overlaps the inner surface 231 of snap ring 60 so that, as retrievable assembly 20' is moved upwardly, snap ring 60 will be held in its fully expanded condition during a short increment of such movement. Thus, by the time portion 230 has cleared surface 231, sleeve member spring 57 will have moved sleeve member 50 upwardly to a position where the outer surface of the sleeve member will contact inner surface 231 of snap ring 60. To ensure upward movement of sleeve member 50, snap ring 110 is arranged to aid the upward force of spring 57.

FIGS. 9 through 11 illustrate a further embodiment of the invention wherein a modified valving arrangement is employed to prevent re-exposure of the formation to pressure and contamination by borehole fluids between successive tests.

As best seen in FIG. 9, the modified packer assembly 19' comprises a tubular body member 30' which may have its upper end adapted for connection to a pipe string (not shown) and its lower end adapted for connection to a perforated plug (not shown). A pair of annular, pliable, expansible packers 31 and 32 are supported about the exterior of body member 30' and separated by a spacer sleeve 33' which is slidably fitted about the body member. The upper end of upper packer 31 is connected to body member 30' and the lower end of lower packer 32 is connected to a hydraulic return sleeve 34 which is slidably received about the body member. Return sleeve 34 and body member 30' have interengaging stepped surfaces to define a sealed hydraulic packer return chamber 35, as best seen in FIGS. 10 and 11.

The annular spaces 36 and 37 between each of packers 31 and 32 and the body member 30' are connected via a passage 38 through spacer sleeve 33' and together form a sealed packer inflating chamber 36–38. The upper end of the inflating chamber 36–38 is connected to the bore of body member 30' by means of inflating passage 39', and a check valve 40' permits entry of fluids from the bore of the body member into the inflating chamber but prevents fluid flow in the opposite direction. A deflating passage 41 through the body member 30' allows fluids trapped within the inflating chamber 36–38 to be exhausted into the bore of the body member.

A test and equalizing passage 232 extends through body member 30' and spacer sleeve 33' to provide a sealed fluid channel between the bore of the body member and the portion of the well bore 10 adjacent the spacer sleeve.

Tubular sleve member 50' is slidably mounted for limited longitudinal movement within the bore of body member 30' and is provided with a test passage 233, an equalizing passage 234, a deflating passage 52, and a series of O-rings 235, 236, 237, 238 and 239, which cooperate to valve selectively the body member test and equalizing passage 232 and deflating passage 41. Downward and upward movement of sleeve member 50' is limited by interengagement of shoulders 53, 54 and 55, 56 located at the upper and lower portions, respectively, of the sleeve member 50' and body member 30'.

The sleeve member 50' may be positioned selectively at upper, intermediate and lower positions within body member 30' by means of a ball lock device, which comprises a plurality of balls 240 arranged within a plurality of slots 241 spaced about and extending through sleeve member 50'. A ball-lock sleeve 242 slidably mounted within the bore of sleeve member 50' retains balls 240 within their respective slots 241. Ball-lock sleeve 242 is retained within the bore of sleeve member 50' by interengagement of its upper end with a shoulder 243 formed within the sleeve member and by interengagement of its lower end with a shoulder 263 formed within the bore of sleeve member 50'. A ball-lock spring 244, which acts in compression between shoulders 245 and 246 formed on the ball-lock sleeve 242 and sleeve member 50', respectively, normally maintains ball-lock sleeve 242 in its uppermost position. In such position, an enlarged-diameter portion 247 of ball-lock sleeve 242 is positioned opposite balls 240 to hold them in a radially extended position at which their effective diameter is greater than the internal diameter of a reduced bore portion 248 formed within body member 30'. However, when ball-lock sleeve 242 is moved downwardly against the force of ball-lock spring 242, a reduced-diameter portion 249 of the ball-lock sleeve moves into position opposite balls 240 to permit them to move inwardly to a radially retracted position at which their effective diameter is less than the internal diameter of reduced bore portion 248 so that sleeve member 50' may move downwardly.

In FIG. 9 the sleeve member 50' is shown in its upper position. Shoulders 55 and 56 at the lower end of the body member 30' and sleeve member 50' are in contact to prevent further upward movement of the sleeve member; and balls 240 are held in their radially extended position by ball-lock sleeve 242 so that they rest upon upper shoulder 250 of reduced bore portion 248 to prevent downward movement of the sleeve member. In FIG. 10, the sleeve member 50' is shown in its lower position. The ball-lock sleeve 242 has been operated to allow the sleeve member 50' to move downwardly; shoulders 53 and 54 on the sleeve member and body member 30', respectively, are in contact to prevent further downward movement; and a spring 57', which acts in compression between shoulder 58 on the body member and shoulder 59 on the sleeve member, has been compressed by the weight of a retrievable assembly 20". In FIG. 11, the sleeve member 50' is shown in its intermediate position. The retrievable assembly 20" has been removed, allowing sleeve member spring 57' to urge the sleeve member upwardly; but upward movement is limited by contact between balls 240 and the lower shoulder 251 of reduced bore portion 248.

When sleeve member 50' is in its upper position (FIG. 9), its equalizing passage 234 registers with the body member test and equalizing passage 232 and its deflating passage 52 registers with the body member deflating passage 41; when sleeve member 50' is in its lower position (FIG. 10), its passage 233 registers with the body member test and equalizing passage 232 and the body member deflating passage 41 is closed by O-rings 238 and 239; and when the sleeve member is in its intermediate position (FIG. 11), the body member test and equalizing passage 232 is closed by O-rings 236 and 237 and the body member deflating passage 41 remains closed by O-rings 238 and 239.

Pressure equalization between the portions of the well bore above and below the packer devices 31 and 32 is provided by pressure by-pass passage 64, which comprises a lateral passage 65 through the upper end of body member 30', a sealed annular space 66 defined by the upper portions of the body member and sleeve member 50', a longitudinal passage 67 through the central portion of the body member, the sleeve member deflating passage 52, the lower bore of the body member, and the perforated plug (not shown).

The upper end of sleeve member 50' fits slidably within the bore of body member 30' and is provided with a plurality of vertical slots 252 through which fluid may pass to reach the inflating passage 39'.

The retrievable assembly 20" shown in FIG. 10 is essentially similar to retrievable assembly 20 described with reference to FIGS 3 and 4, except for a latching device arranged about the upper end of sampler valve sleeve 72" for operating the sleeve member ball-lock. The latching device comprises a tubular sleeve 253 slidably received about the exterior of the valve sleeve 72".

Sleeve 253 is mounted between upper and lower latch springs 254 and 255, which bear against the ends of the sleeve and against upper and lower shoulders 256 and 257 formed on the sampler valve sleeve 72″. Thus, sleeve 253 may be moved upwardly or downwardly against the bias of springs 254 and 255, respectively. A plurality of balls 258 are retained within a plurality of holes 259 spaced radially through tubular sleeve 253. Sleeve 253 is normally maintained at a centralized position by springs 254 and 255. In such position, balls 258 bear against the outer surface of sampler valve sleeve 72″ and are thereby kept at an outwardly extended position where their effective diameter is greater than the internal diameter of the upper end of ball-lock sleeve 242. However, when sleeve 253 is moved upwardly or downwardly against the bias of springs 254 and 255, then balls 258 are moved into position opposite a plurality of holes 260 and 261 radially spaced about sampler valve sleeve 72″ and vertically aligned with holes 259. In such position, the balls 258 may move inwardly to a radially retracted position at which their effective diameter is less than the internal diameter of the upper end of ball-lock sleeve 242. Ball-lock sleeve 242 has within its bore an enlarged-diameter portion 262 having a diameter slightly greater than the effective diameter of balls 259 in their radially extended position. Spring 254 is appreciably stiffer than ball-lock spring 244 so that when balls 258 bear against the upper end of ball-lock sleeve 242, the ball-lock spring 244 will be compressed to permit ball-lock sleeve 242 to move to its lowermost position before sleeve 253 is moved upwardly relative to sampler valve sleeve 72″.

As previously mentioned, the structure and operation of retrievable assembly 20″ are in other respects the same as described with respect to retrievable assembly 20 illustrated in FIGS. 3 and 4. Passages 95 and 96 of retrievable assembly 20″ are arranged to be in fluid communciation with sleeve member fluid passage 233 when assembly 20″ is in its seated position within the bore of sleeve member 50′.

In operation the packer assembly 19′ is connected to the end of a pipe string 12 with its parts in the positions shown in FIG. 9, and the pipe string 12 is lowered into the well bore until packer spacer sleeve 33′ is positioned opposite the zone to be tested. During the lowering operation, the bore of the pipe string 12 fills with drilling fluid 11 which enters through the perforated plug 23, and at any time during the lowering operation drilling fluid may be pumped downwardly through the bore of the pipe string 12 and packer assembly 19 and out of the perforated plug 23 to return to the surface via the annulus between the pipe string and the well wall. The ball lock device holds sleeve member 50′ in its *uppermost* position so that the equalizing passages 232, 234 and the deflating passages 41, 52 are open.

When packer assembly 19′ is positioned opposite the test zone, the retrievable assembly 20″ shown in FIG. 10 may be lowered through the bore of the pipe string. As assembly 20″ enters packer assembly 19′, balls 258 contact the upper end of ball-lock sleeve 242 and the weight of assembly 20″ compresses ball-lock spring 244, moving ball-lock sleeve 242 to its lowermost position. Balls 240 then move to their radially retracted position, permitting sleeve member 50′ to move downwardly toward its lower position. As assembly 20″ continues to move downwardly, its weight compresses spring 254 of the latching device until balls 258 move into position opposite holes 260 through the sampler valve sleeve 72″. Balls 258 then move inwardly to their radially retracted position, permitting ball-lock sleeve 242 to be biased back to its uppermost position. Spring 254 of the latching device then moves sleeve 253 back to its centralized position to cam balls 258 outwardly to their radially extended position within enlarged-diameter portion 262 of ball-lock sleeve 242. Downward movement of assembly 20″ continues until shoulder 74 of sampler valve sleeve 72″ contacts shoulder 75 of sleeve member 50′ whereupon the weight of assembly 20″ compresses sampler valve spring 57′ and moves the sleeve member to its lower position. The sleeve member 50′ and retrievable assembly 20″ will then be in the positions shown in FIG. 10, with fluid passage 233 in register with the body member test and equalizing passage 232 and with the body member deflating passage 41 closed by O-rings 238 and 239. Body member test and equalizing passage 232 is in fluid communication with the shut-in pressure chamber 91 via sleeve member test passage 233, sampler valve sleeve passage 95 and sampler valve mandrel passage 98.

Fluid pressure may then be applied to the bore of the pipe string 12 by means of pump 15 (shown in FIG. 1) to force fluid through slots 252 at the upper end of sleeve member 50′, past balls 258, into body member inflating passage 39′, through inflating check valve 40′ and into the inflating chamber to expand packers 31, 32 into sealed engagement with the well wall, as shown in FIG. 10. As previously described with reference to FIGS. 2–4, the sampler valve mandrel 73 will remain in its extended position relative to sampler valve sleeve 72″ until the pump pressure within the pipe string is raised to a predetermined value. FIG. 10 illustrates the well tool in such condition, with packers 31 and 32 inflated and with mandrel 73 still in its extended condition. Upon application of further fluid pressure, the sample-taking operation may be conducted as described with respect to FIGS. 2–4.

As retrievable assembly 20″ is lifted from its seated position within packer assembly 19′, sleeve member spring 57′ moves sleeve member 50′ upwardly until balls 240 of the latching device contact shoulder 251 of body member reduced bore portion 248. Since ball-lock sleeve 242 is in its uppermost position, balls 240 are held in their radially extended position, thus preventing sleeve member 50′ from moving further upwardly. To ensure that sleeve 242 will hold them in that position, the inner balls 258 initially aid spring 244 to place sleeve 242 in its upper position. Continued lifting of assembly 20″ compresses latch spring 255 until balls 258 move into position opposite holes 261. Balls 258 may then move to their radially retracted position permitting the latching device to clear ball-lock sleeve 242. Assembly 20″ then may be lifted to the surface by wire line 21 for examination and analysis of the entrapped fluid sample.

After assembly 20″ is removed from packer assembly 19′, sleeve member 50′ remains in its intermediate position as illustrated in FIG. 11. The body member test and equalizing passage 232 is closed by O-rings 236 and 237 to prevent well fluid from the bore of the pipe string from contaminating the test zone, and the body member deflating passage 41 remains closed by O-rings 238 and 239 so that packers 31 and 32 remain inflated and in sealed engagement with the well wall. Another or the same retrievable assembly 20″ then may be lowered through the pipe string and a second fluid sample may be taken. When the second assembly 20″ lands at its seated position within packer assembly 19′, sleeve member 50′ again will be moved to its lower position to reopen the test passages and the second sample may be taken in the manner previously described.

After a sufficient number of fluid samples have been recovered, a retrievable release assembly 264, shown in FIG. 12, is lowered through the pipe string to engage sleeve member 50′ and return it to its upper position. Assembly 264 comprises a weighted mandrel 265 which may be connected at its upper end to a wire line (not shown). Mandrel 265 has arranged about its lower end a latching device similar to that previously described with reference to FIG. 10. The latching device comprises a sleeve 266 slidably received about mandrel 265, a plurality of balls 267 retained within sleeve 266, and upper and lower latch springs 268 and 269 which act in compression between the respective ends of sleeve 266 and shoulders 270 and 271 formed on the exterior of mandrel 265. Springs 268 and 269 normally maintain sleeve 266 at a centralized position at which balls 267 bear against the outer surface of mandrel 265 and are thereby kept at an outwardly extended position where their effective diameter is greater than the internal diameter of a reduced bore portion 272 formed within sleeve member 50'. Annular grooves 273 and 274 on mandrel 265 are arranged respectively above and below the centralized position of balls 267, so that when sleeve 266 is moved upwardly or downwardly, balls 267 may move inwardly to a radially retracted position at which their effective diameter is less than the internal diameter of reduced bore portion 272.

Upper latch spring 268 is relatively weak so that, as assembly 264 moves downwardly into sleeve member 50', balls 267 may easily be moved into position opposite groove 273 to allow the latching device to pass the various shoulders and reduced bore portions of the sleeve member ball lock device.

The lower portion of mandrel 265 is sized to fit slidably within the bore of ball-lock sleeve 242. An enlarged-diameter portion 275 at the upper end of mandrel 265 forms a shoulder 276 which engages the upper end of ball-lock sleeve 242 to move it downwardly as assembly 264 is lowered. Shoulder 276 and balls 267 are spaced so that, when ball-lock sleeve 242 has been moved to its lowermost position, balls 267 will have passed reduced bore portion 272 of sleeve member 50' and will have been cammed to their outwardly extended position by upper latch spring 268.

When assembly 264 reaches this lowermost position, it is then moved upwardly by means of wire line 21. Balls 267 will contact the lower end of reduced bore portion 272 to impart the upward motion of assembly 264 to sleeve member 50'. Lower latch spring 269 is sufficiently strong so that the entire weight of the sleeve member 50' may be supported without moving balls 267 into position opposite lower groove 274. Since ball-lock sleeve 242 is held in its lowermost position by mandrel shoulder 276, balls 240 may move to their radially retracted position to pass within the bore of sleeve member reduced bore portion 248.

When sleeve member 50' reaches its upper position, additional pull may be applied to wire line 21 to compress lower latch spring 269 so that balls 267 may drop into lower mandrel groove 274, thus permitting the assembly 264 to be pulled clear of packer assembly 19'. As this is done, ball-lock spring 244 moves all-lock sleeve 242 back to its uppermost position to lock balls 240 in their radially extended position. Thus, sleeve member 50' is again locked in its upper position, deflating passage 41 has been opened to allow packers 31 and 32 to drain, and sleeve member equalizing passage 234 has been brought into register with body member test and equalizing passage 232. The packer assembly 19' may then be moved into position opposite another test zone and the sample-taking operation repeated.

It will be readily apparent that the above-described latching device may be arranged about a retrievable assembly, such as assembly 20" shown in FIG. 10, so that a fluid sample may be obtained when the assembly is lowered through the pipe string and thereafter to return sleeve member 50' to its upper position.

As previously described, the structure of retrievable assembly 20 (FIGS. 2 and 3) and retrievable assembly 20' (FIG. 10) is such that the entire weight of sampler valve mandrel 73 and the sample chamber section 71 is borne by the sampler valve spring 76 whenever the assemblies are in their seated position within the packer assembly. Thus, if it is desired to use a great number of sample chambers, a heavier sampler valve spring must be used to support the added weight. To obviate this difficulty, there may be utilized a modified form of retrievable assembly 20''' illustrated in FIG. 13, wherein the weight of the mandrel and sample chambers is supported entirely by the sleeve member 50'.

In FIG. 13, the packer assembly 19' is identical to that illustrated in FIGS. 9–13. Retrievable assembly 20''', however, comprises a sampler valve section 70', which may be slidably received within the bore of sleeve member 50', and a sample chamber section 71 which is connected to the upper end of valve section 70'. The structure and function of sample chamber section 71 is identical to that previously described except as specified in the following description.

Sampler valve section 70' comprises a valve mandrel 73' and a valve 72''' slidably received thereabout for limited longitudinal movement between an upper, or extended, position and a lower, or retracted, position. Interengagement of shoulders 277 and 278 formed on the valve sleeve 72''' and the mandrel 73', respectively, limits downward movement of the valve sleeve at its lower position; and interengagement of shoulders 279 and 280 formed on the mandrel and valve sleeve, respectively, limits upward movement of the valve sleeve at its upper position (as shown in FIG. 13). A pair of sampler valve springs 281 and 282, which act in compression between shoulders formed on the mandrel 73' and the valve sleeve 72''', urge the sleeve toward its upper position relative to the mandrel.

The assembly 20''' is supported in its seated position within sleeve member 50' by interengagement of a tapered shoulder 74' formed at the lower end of sample chamber section 71 with tapered shoulder 75 formed at the upper end of sleeve member 50'. Thus, when assembly 20''' is in its seated position, the entire weight of the sample chamber section 71 and the mandrel 73' is directly supported by sleeve member 50'. Sampler valve springs 281 and 282 support only the weight of sampler valve sleeve 72'''. Slots 283 formed about the periphery of shoulder 74' permit fluid pressure in the bore of the pipe string to be transmitted past the interengaging shoulders and into the annular space between sleeve member 50' and mandrel 73'.

When retrievable assembly 20''' is in its seated position, the bore of the packer assembly 19' is closed to fluid flow by O-rings 80, 284, 285, which seal between body member 30', sleeve member 50', sampler valve sleeve 72''', and sampler valve mandrel 73', respectively; and fluid pressure applied to the bore of pipe string 12 will act upon sampler valve sleeve 72''' to urge it downwardly against the force of valve springs 281 and 282. In order to pre-select the pump pressure required to move the sampler valve sleeve 72''' to its lower position, only the diameters of the sampler valve sleeve and mandrel 73' and the spring rates of valve springs 281 and 282 need be considered since none of the weight of the sample chamber section 71 or the valve mandrel 73' is supported by the valve springs. Hydrostatic pressure effects upon the sampler valve sleeve 72''' are balanced since the upper O-ring 285 between the sleeve and mandrel 73' is exposed to the hydrostatic pressure within the bore of the pipe string and the lower O-ring 286 between the sleeve and mandrel is exposed to the hydrostatic pressure outside the pipe string via the pressure by-pass passage 64 and ports 287 located in the lower portion of the sleeve 72'''.

Sampler valve mandrel 73' has arranged about its upper end a latching device which is identical in its structure and operation with the previously described latching device illustrated in FIG. 10.

The interior of the sampler valve mandrel 73' is divided into a sample-receiving conduit 90 and a shut-in pressure chamber 91 in the same manner as previously described with reference to FIGS. 3–4. Conduit 90 and pressure chamber 91 are placed selectively in fluid communication with the packer assembly test passage 232, 233 by means of a pair of longitudinally spaced passages 95 and 96 through the sampler valve sleeve and a pair of longiudinally spaced passages 97 and 98 through the sampler valve mandrel 73'. Passages 97 and 98 communicate with the sample-receiving conduit 90 and the shut-in pressure chamber 91, respectively. Passages 95 and 96 are placed to be in sealed fluid communication with sleeve member test passage 233 in both the upper and lower positions of the sampler valve sleeve 72'''. In the upper position of the sampler valve sleeve, lower mandrel passage 98 registers with lower sleeve passage 96 and only the shut-in pressure chamber 91 is in fluid communication with sleeve member test passage 233; whereas, in the lower position of the sampler valve sleeve, both the upper and lower mandrel passages 97 and 98 register with the upper and lower sleeve passages 95 and 96, respectively, so that fluid communication is provided from the sleeve member test passage 233 to both the sample-receiving conduit 90 and the shut-in pressure chamber 91.

The apparatus of FIGURE 13 is operated in the same manner as the apparatus described with reference to FIGS. 9–12. As shown in FIG. 13, the packer assembly 19' has been positioned within the borehole opposite the test zone, retrievable assembly 20''' has been lowered into its seated position to move sleeve member 50' to its lower position, and pump pressure has been applied to the bore of the pipe string to inflate packers 31 and 32. Upon further increase in pump pressure, the sampler valve sleeve 72''' will be moved to its lower position to open sample-receiving conduit 90 to the test zone and the sample-taking operation may be continued as previously described.

FIG. 14 shows a portion of the packer asembly 19' illustrated in FIG. 13 and further illustrates a modified retrievable assembly 20'''' for use in making the final sample-taking operation at a specific test zone. Assembly 20'''' is identical with assembly 20''' illustrated in FIG. 13 except for the release device arranged about the upper end of valve mandrel 73''. The arrangement and operation of the release device is identical with the device illustrated in FIG. 12 and referenece is made to the description of that figure for an explanation of such structure and its operation.

The embodiments of the invention illustrated in FIGS. 15 through 34 are adapted for testing and treating operations conducted during drilling of a well. In FIG. 15, a packer assembly 19h is shown installed as an integral part of a pipe string 12 within a borehole 10. Attached to the packer assembly 19h is drill bit 300. A retrievable assembly 20h is adapted to be raised or lowered within the pipe string 12 by means of a wire line 21 spooled upon, and driven by, a power winch 22 and is shown as it is being lowered into the pipe string 12.

One embodiment of the "test-while-drilling" apparatus of the invention is illustrated in FIGS. 16 through 23. The packer assembly 19h of FIG. 16 includes a tubular body member 301 connected at its upper end to the pipe string 12 and to the drill bit 300 at its lower end.

A single, pliable, expansible packer element 302 is supported about the exterior of the body member 301 with its ends connected to the body member 301. The annular space 303 between the packer element 302 and body 301 is connected to spaced-apart positions of the central bore of the body by longitudinal passages 304, 305 extending through the body. In one of these passages, inflating passage 304, a check valve 306 is provided to permit the flow of fluids into passage 304 from the central bore of the body member 301 to the annular space 303, but prevent fluid flow in the opposite direction. In the other of these passages, deflating passage 305, a check valve 307 is provided to permit flow of fluids from the annular space 303 into the central bore of the body 301 and to prevent flow in the opposite direction.

A tubular sleeve member 50h is slidably mounted for limited longitudinal movement within the bore of the body member 301. Spaced-apart lateral passages through the sleeve member 50h provide a sleeve fluid passage 308 and a sleeve by-pass passage 309. A sleeve spring 313 acts in compression between shoulders 314 and 315 located on the body member 301 and the sleeve member 50h, respectively, to urge the sleeve member towards its uppermost position. A resiliently contractible snap ring 316 is mounted in the bore of the body member 301 to releasably lock the sleeve member 50h in its lowermost position and to releasably retain the sleeve member in its uppermost position. Downward movement of the sleeve member 50h is limited by interengagement of shoulders 315 and 310 on the sleeve member 50h and the body member 301, respectively.

A by-pass passage 317 through the body member 301 provides communication from the annulus of the wellbore 10 above the packer element 302 to the central bore of the body member at a position adjacent the lower end of the sleeve member 50h and below the sleeve fluid passage 308. The by-pass passage 317 registers with the sleeve by-pass passage 309 when the sleeve member 50h is in the lower position and it is closed by O-rings 318 and 319 when the sleeve member 50h is in the upper position.

A body fluid passage 320 through the body member 301 provides communication from the annulus of the wellbore 10 below the packer element 302 to the central bore of the body member at a point substantially above the lower portion of the sleeve member 50h. A check valve 326 is provided in passage 320 to permit flow of fluid from the annulus through the body member 301, but to prevent flow in the reverse direction the upper end of fluid passage 320 registers with sleeve fluid passage 308 when the sleeve member 50h is in the lower position and these fluid passages are sealed against contamination by drilling fluid or other fluids by means of O-rings 323 and 324.

The retrievable assembly 20h illustrated in FIG. 19 is shown seated within the packer assembly 19h in FIGS. 20 and 21. The valve section 70h or assembly 20h is adapted to be slidably received within the bore of the sleeve member 50h. The valve section 70h comprises two telescopically arranged members, an outer valve sleeve 72h and inner valve mandrel 73h, which respectively have interengaging surfaces to limit their relative movement between an extended position and a retracted position. In the extended position (FIGS. 19 and 21), shoulder 330 on the valve mandrel 73h engages shoulder 331 at the bottom of the valve sleeve 72h to limit the extent of movement; and, in the retracted position (FIG. 20), shoulder 332 on the mandrel engages shoulder 333 at the upper end of the valve sleeve. A valve assembly spring 334 is positioned to act in compression between the shoulder 333 at the upper end of the valve sleeve 72h and a shoulder 335 at the base of the valve assembly chamber 71h.

As seen in FIGS. 19 through 23, a barrier valve member 336 comprising a barrier mandrel 339 and a barrier sleeve 341 is dependently mounted from the inner valve mandrel 73h. This barrier valve 336 is adapted to be received within a reduced portion 321 of the central bore of the body member 301 and fluidly sealed therein by an O-ring 337 around the barrier sleeve 341. The barrier valve 336 together with check valve 326 have a primary function of preventing drilling fluid from passing downwardly through the body of the tool into the packed-off zone of the well bore 10 between sampling operations and a further function, in cooperation with by-pass passage 317, of permitting equalization of the hydrostatic pressure in the annulus of the well bore 10 above the packer elements 302 and within the central bore of the sleeve member 50h without introducing drilling fluid into the packed-off zone below the packer element 302 when the sleeve member 50h is in its lower position.

The barrier valve 336 may be positioned in the lower portion of the body member 301 by any suitable means, such as the detachable connection by means of shear pin 338 passing through barrier mandrel 339 and a lower extension of valve mandrel 73h as shown in FIG. 19. The barrier sleeve 341 is provided with lateral ports 340; and a passageway 342 in the barrier mandrel 339 communicates with ports 343 therein. Movement of barrier valve mandrel 339 relative to barrier valve sleeve 341 is limited in the upward direction by interengagement of shoulders 344a and 344b on the barrier mandrel 339 and barrier sleeve 341, respectively. Movement of barrier valve mandrel 339 in the downward direction is limited by interengagement of shoulders 344c and 344d on the barrier mandrel and barrier sleeve 341, respectively.

In the extended position of the barrier mandrel 339 relative to the barrier sleeve 341, the ports 340, passageway 342 and ports 343 provide fluid communication through the barrier valve 336 permitting equalization of pressure above and below the O-ring 337 when the barrier valve is seated within the reduced bore portion 321 of the body 301 of the packer assembly 19h. The barrier valve member 336 is further provided with a check valve 346 to release whatever pressure that may build-up below the barrier valve during the expansion of the packer element 302 but to prevent the passage of drilling fluid downwardly through the barrier valve member. When the barrier mandrel 339 is in the retracted position, the ports 340 in the barrier sleeve 341 are closed by O-rings 347 and 348.

When the retrievable assembly 20h is in its seated position with the bore of sleeve member 50h (FIGS. 20 and 21), the bore of the packer assembly 19h is closed to downward fluid flow by O-rings 350, 351 and 352, which seal between the body member 301, sleeve member 50h, valve sleeve 72h and valve mandrel 73h, respectively. Fluid pressure applied by means of pump 15 to the bore of the pipe string 12 will act upon the valve mandrel 73h to urge it downwardly relative to the valve sleeve 72h against the force of valve spring 334 until shoulders 332, 333 are engaged. The weight of the valve mandrel 73h and sample chamber section 71, the diameter of the valve mandrel and the spring rate of the valve spring 334 are so chosen that the valve mandrel will be moved to its retracted position (FIG. 20) whenever a predetermined pump pressure is applied.

The upper side of the upper O-ring 352 around the valve mandrel 73h is exposed to the hydrostatic pressure within the bore of the pipe string and the lower face of the lower O-ring 353 around the valve mandrel is exposed to the hydrostatic pressure in the well bore annulus above the packing element 302 which is communicated through the body by-pass passage 317 and the sleeve by-pass passage 309. Therefore, the valve mandrel 73h is pressure-balanced within the valve sleeve 72h insofar as the hydrostatic head of drilling fluid is concerned so long as the same hydrostatic head exists within and outside the pipe string 12.

The interior of the valve mandrel 73h is divided into two separate compartments by a bore-closing portion 355 near its lower end. The upper compartment 356 of the valve mandrel 73h forms a fluid conduit which opens into the chamber section 71h and the lower compartment 357 forms a closed shut-in pressure chamber. Conventional time-pressure recorders 358 and 359 are mounted in each of the shut-in pressure chamber 357 and valve chamber section 71h respectively.

The retrievable valve assembly 20h has valve means similar to those already discussed in prior embodiments for placing selectively either the shut-in pressure chamber 357 or both the shut-in pressure chamber and the upper compartment 356 in fluid communication with the sleeve member fluid passage 308. The valve means in this embodiment comprises a lateral passage 360 extending through the valve sleeve 72h between spaced O-rings 351 and 351a which seal the sleeve 72h within sleeve member 50h and a pair of longitudinally spaced lateral passages 361 and 362 extending into the valve mandrel 73h on opposite sides of the bore-closing portion 355. The lateral passages 361 and 362 are so positioned and spaced that, in the extended position of mandrel 73h relative to valve sleeve 72h (FIG. 19), the lower passage 361 through the mandrel registers with the valve sleeve passage 360, placing the shut-in pressure chamber 357 in fluid communication with the sleeve member fluid passage 308 (FIG. 21), and the passage 362 is closed by O-rings 352 and 363. In the retracted position of the mandrel 73h relative to the valve sleeve 72h (FIG. 20), both the lower and upper passages 361 and 362 communicate with sleeve passage 360. An enlarged section 364 of the bore of the valve sleeve 72h provides an annular passage for communication between the passage 361 and the sleeve fluid passage 360 when the mandrel 73h is in the retracted position.

In FIG. 23, the lower portion of a modified retrievable assembly 20j is illustrated. The assembly 20j is adapted for use when taking the final fluid sample from a specified test zone. Modified assembly 20j differs from assembly 20h only in that the upper portion of the sampler valve sleeve 72j is enlarged in diameter to provide an unlocking head 365 and an overshot grapple member 366 is provided at the lower end of the valve mandrel 73j. The enlarged-diameter portion of head 365 functions to release the sleeve member 50h from its locked lowermost position since it has sufficient diameter to retain the snap ring 316 in an expanded position as the retrievable assembly 20j is first raised from its seated position. The grapple member 366 may be of the conventional overshot type adapted to grip the retrieving head 367 of the barrier valve mandrel 339.

To perform testing operations within a well bore during drilling, the packer assembly 19h is connected to the end of the pipe string 12 with the drill bit 300 attached below as shown in FIG. 16. During the drilling operation, drilling fluid is normally circulated through the bore of the pipe string 12, passing downwardly through the bore of the bit 300 and thence upwardly through the annulus surrounding the pipe string 12. As shown in FIG. 16, the sleeve member 50h is held in its upper position by the spring 313 and by snap ring 316 which is positioned in the recess 370 near the upper end of the sleeve member. In this position the body bypass passageway 317, the inflating passageway 304, and body fluid passage 320 are closed, and the deflating passage 305 is open.

When a zone to be tested is penetrated by the bit, drilling is halted and the retrievable assembly 20h with the barrier valve member 336 attached by shear pin 338 is lowered through the bore of the pipe string 12.

Upon reaching the packer assembly 19h, the retrievable assembly 20h is lowered as seen in FIG. 20 until the valve sleeve 72h is sealingly received within the sleeve member 50h. The weight of the retrievable valve assembly 20h is suffcient for the tapered surface of slot 370 to momentarily expand the cam-actuated snap ring 316 and allow sleeve member 50h to move to its lowermost position and to compress the sleeve spring 313. Once the snap ring 316 is cleared, the uppermost face of sleeve member 50h will be engaged by the lower face of snap ring 316 as it again contracts and the sleeve member will be secured in place. This downward movement of the sleeve member 50h opens the inflating passage 304 to the central bore of the body 301 and tubing string 12. The sleeve 341 of the barrier valve member 336 is sealingly received within the reduced bore portion 321 in the lower end of the body member 301 and rests on shoulder 314 so that the barrier valve mandrel 339 is lowered to its retracted position relative to the barrier sleeve 341.

The packer element 302 is inflated by applying pump pressure to the pipe string 12 at the surface to open inflating check valve 306 at the upper end of inflating passage 304 and inflate the packer element 302. When the pump pressure reaches a predetermined level (for example 500 p.s.i.g.), the packer element 302 will be sufficiently expanded for an effective pack-off of the zone therebelow.

At this step of the operation the valve mandrel 73h is in its uppermost position relative to the valve sleeve 72h of the retrievable assembly 20h. When the pump pressure is further increased to another predetermined value (for example 750 p.s.i.g.), the hydraulic pressure will move valve mandrel 73h downwardly relative to the valve sleeve 72h which is held in place by the engagement of shoulders 310, 315. The downward travel of the mandrel 73h shears pin 338 by which the retrievable barrier valve 336 was initially secured to the valve mandrel and allows the mandrel to move on downwardly to its lowermost position as illustrated in FIG. 20. Once the valve mandrel 73h reaches this position, formation fluids enter body fluid passage 320, pass through sleeve fluid passage 308 and valve sleeve passage 360 and enter lower and upper valve passages 361 and 362 to allow the pressure recorders 358 and 359 to record the initial formation flowing pressure.

If a shut-in pressure is desired, after a short time interval to relieve the hydrostatic drilling fluid pressure and the packer squeeze pressure trapped below the packer 302, the pump pressure in the bore of the pipe string 12 is reduced to return the valve mandrel 73h to its extended condition (FIG. 21) to terminate the flow into chamber 71h. If the formation has been permitted to flow only a brief period of time, the formation pressure will not have decreased materially and the lower pressure recorder 358 will record the true or initial shut-in pressure. The pump pressure may then be raised above the predetermined value necessary to move the valve mandrel 73h to its retracted condition so as to complete the flow test and, if desired, the valve mandrel 73h may be maintained in this position for a sufficient time to obtain a record of a final shut-in pressure, as well. As noted in the prior discussion of other embodiments, the flow test may be interrupted at any time and a re-measurement of shut-in pressure made.

During a series of tests at a particular test zone, the barrier valve member 336 remains seated in the lower portion of the body 301 of the well tool to prevent drilling fluid from entering the packed-off zone.

When the final sample is to be taken in this particular series of tests, the retrievable assembly 20h is recovered by the wire-line 21. As seen in FIG. 22, the valve mandrel 73h and the valve sleeve 72h are removed leaving sleeve member 50h secured in place by snap ring 316. The barrier valve assembly 336 remains seated in reduced bore portion 321. After the removal of the valve mandrel 73h and sleeve 72h, the bore of the packer assembly 19h is clear for entry of the retrievable assembly 20j.

Thus, as seen in FIG. 23, the retrievable assembly 20j has been lowered in the packer assembly 19h and is now being retrieved. While in place within sleeve member 50h, the assembly 20j functions in the same manner as the valve assembly 20h to take test samples and measure formation pressures. As it is being seated in its operative position within the sleeve member 50h, the enlarged latching head 365 expands and holds the contractible split ring 316 outwardly and the depending fingers of grapple 366 will slip over and engage the retrieving head 367 of the barrier valve 366. At the conclusion of the desired sampling and pressure testing, the retrievable assembly 20j is raised by the wire-line 21. The snap ring 316 no longer constrains the upper end of sleeve member 50h so that during the initial upward travel of retrievable assembly 20j, the sleeve member 50h is free to move upwardly and be returned to its uppermost position by spring 313. When the sleeve member 50h reaches the position illustrated in FIG. 23, it is again releasably locked in this position by the contractible snap ring 316 which snaps into the slot 370 of sleeve member 50h.

During this same initial upward movement of the retrievable assembly 20j, the barrier mandrel 339 is also raised by the grapple fingers 366 until shoulder 370 on the mandrel engages shoulder 371 on the barrier sleeve 341. In this position, the port 340 is opened and pressures above and below the barrier valve member 336 are equalized through passage 342. This relieves hydrostatic pressure above the barrier valve 336 and facilitates its removal along with the retrievable assembly 20j. After the retrievable assembly 20j and barrier valve 336 have been removed from the packer assembly 19h, drilling may be resumed or the packer assembly 19h may be repositioned and further operations conducted.

FIGS. 24 through 33 illustrate a further embodiment of the invention which is arranged for testing and treating while drilling. As may best be seen in FIG. 24, the modified packer assembly 19m comprises a tubular body member 425 which may have its upper end adapted for connection to a pipe string (not shown) and its lower end adapted for connection to a drill bit 300. Pliable expansible sleeve or packer 426 is supported about the exterior of the body member 425 with its upper and lower ends sealingly connected around the body member.

A longitudinal passage 430 is provided in the body 425 between the annular space 427 between the packer 426 and the body member 425 to the central bore of the body member 425. A check valve 431 is placed in the passage 430 to permit entry of fluids from the bore of the body member 425 through the inflating passage 430 into the annular space 427 but prevent fluid flow in the opposite direction. A fluid passage 432 extends through the body member 425 to provide fluid communication between the bore of the body member and the well bore below the packer element 426.

A tubular sleeve member 50m is slidably mounted for limited longitudinal movement between upper, lower and intermediate positions within the bore of body member 425 and is provided with a sleeve fluid passage 425, a sleeve discharge passage 436 in the annulus between sleeve 50m and the bore of the body member 425. A series of O-rings 438–446 around the sleeve 50m cooperate to valve selectively the body member fluid passage 432, body passage 434 and the body by-pass passage 433. Downward movement of sleeve member 50m is limited by interengagement of shoulders 447 and 448 of the sleeve member 50m and body member 425, respectively. Upward movement of the sleeve member 50m is limited by interengagement of shoulders 449 and 450 on the sleeve member 50m and the body member 425, respectively.

The deflating passage 434 is connected between the annular space 427 and the bore of the body member 425 where, depending upon the position of the sleeve member 50m, the passage 434 may be selectively closed by O-rings 442 and 443 when the sleeve 50m is in lower or intermediate positions or it may be connected to the passage 436 which is formed by a reduced diameter portion of the sleeve member 50m. As may be seen in FIG. 24, when the sleeve member 50m is in its upper position, the deflating passage 434 is in fluid communication with the passage 436 and thereby with the deflating discharge passage 451 through the body member 425 to discharge fluid from the annular space 427 into the annulus of the well below the packer element 426. A fluid by-pass is provided between the annulus surrounding the body member 425 above the packer element 426 to the central bore of the body member at a point near the lower end of the sleeve member 50m and below the body fluid passage 432 by means of by-pass passage 433.

As shown in FIG. 26, a screen 452 may be provided to cover the upper opening of by-pass passage 433. Depending upon the position of the sleeve member 50m as shown in FIG. 25, by-pass passage 433 is selectively communicated with either the sleeve by-pass passage 453 by means of the longitudinal annular passage 454 when the sleeve 50m is in both the lower and intermediate positions or the passage 433 is closed by O-rings 445 and 446 when the sleeve 50m is in its upper position.

The sleeve member 50m may be positioned selectively at upper, intermediate and lower positions within the body member 425 by means of a ball-lock device, which comprises a plurality of balls 455 arranged in slots 456 spaced about and extending through the sleeve member 50m. As can be best seen in FIGS. 26 and 31–33, a ball-lock sleeve 457 slidably mounted within the bore of the sleeve member 50m controls the position of the balls 455 within their slots 456. Ball-lock sleeve 457 is retained within the bore of sleeve member 50m by interengagement of its upper end with a shoulder 458 formed within the sleeve member and by interengagement of its lower end with another shoulder 459 formed within the bore of the sleeve member. A ball-lock spring 461, which acts in compression between shoulders 462 and 463 formed on the ball-lock sleeve 457 and sleeve member 50m, respectively, normally maintains the ball-lock sleeve in its uppermost position (FIG. 31). In such uppermost position an enlarged-diameter portion 464 of the ball-lock sleeve 457 is positioned opposite balls 455 to hold them in a radially extending position at which their effective diameter is greater than the internal diameter of a reduced bore portion 470 formed within the body member 425. However, when the ball-lock sleeve 457 is moved downwardly against the force of the ball-lock spring 461, a reduced-diameter portion 471 of the ball-lock sleeve moves into position opposite balls 455 to permit them to move inwardly to a radially retracted position at which their effective diameter is less than the internal diameter of a reduced bore portion 470 formed within the body member 425, so that the sleeve member 50m may move either upwardly or downwardly past the enlarged bore portion 470 (FIG. 33).

In FIGS. 24 and 31, the sleeve member 50m is shown in its uppermost position. Shoulders 449 and 450 at the lower end of the body member 426 and sleeve member 50m, respectively are engaged and prevent further upward movement of the sleeve member; and the balls 455 are held in their radially extended position by ball-lock sleeve 457 so that they rest upon upper shoulder 471 of the reduced-bore portion 470 to prevent downward movement of sleeve member 50m.

In FIGS. 25, 27 and 33, the sleeve member 50m is shown in its lowermost position. The ball-lock sleeve 457 has been operated to allow the sleeve member 50m to move downwardly; shoulders 447 and 448 on the sleeve member 50m and body member 425, respectively, are engaged and prevent further downward movement; and a sleeve spring 473, which acts in compression between the shoulder 474 on the body member and the shoulder 475 on the sleeve member has been compressed by the weight of the retrievable assembly 20m.

In FIGS. 29 and 32, the sleeve member 50m is shown in its intermediate position. The retrievable assembly 20m has been removed in FIG. 29 allowing the sleeve spring 473 to urge the sleeve member 50m upwardly; but upward movement of the sleeve member is limited by contact between the balls 455 and the lower shoulder 472 of the reduced-bore portion 470 so that the sleeve member 50m is held in the intermediate position.

When sleeve member 50m is in its upper position (FIG. 24), the deflating passage 436 therethrough registers with the deflating passage 434 in the body and the deflating discharge passage 451; the fluid passage 432 is closed by O-rings 440 and 441; and the inflating passage 430 is closed by O-rings 438 and 439. When the sleeve member 50m is in its lower position (FIG. 25) its fluid passage 435 registers with the body fluid passage 432; the inflating passage 430 is open to communication with the bore of the body member by means of the annular space 477 between the upper portion of the sleeve member 50m and the body member the by-pass passage 433 is in communication with the sleeve by-pass passage 453; and the deflating passage 434 is closed by O-rings 442 and 443. When the sleeve member is in its intermediate position (FIGS. 29 and 32) the body member fluid passage 432 is closed by O-rings 440 and 441; the inflating passage 430 is open; the body member deflating passage 434 remains closed by O-rings 442 and 443; and the by-pass passage 433 remains in communication with sleeve by-pass passage 453.

The retrievable assembly 20m shown in FIG. 25 is provided with a latching device at the upper end of valve mandrel 73m for operating the sleeve member ball-lock to take a series of samples without deflating the packer member 426. The latching device of retrievable assembly 20m (see FIGS. 26 and 31) comprises a shear pin collar 480 initially retained in the position shown in FIG. 31 by shear pin 481. The shear pin collar 480 has sufficient diameter to engage the upper end of ball-lock sleeve 457 as the retrievable assembly 20m enters the packer assembly 19m to move the ball-lock sleeve downwardly to unlock the balls 455 and permit the sleeve member 50m to move downwardly past the enlarged bore portion 470 of body member 426.

As shown in FIG. 25, for example, an internal shoulder 481 on valve sleeve 72m is, cooperatively arranged in relation to a shoulder 482 on the valve mandrel 73m to provide co-engaging surfaces to limit the upward movement of the sleeve. A compression spring 479 between shoulders 483 and 484 on the valve sleeve 72m and valve mandrel 73m, respectively, urges the sleeve upwardly.

O-rings 485, 485a are provided at opposite ends of the valve sleeve 72m to fluidly seal the sleeve within the central bore of the sleeve member 50m when the retrievable assembly 20m is in place therein. O-rings 490, 486, 486a and 486b are provided at spaced intervals around the valve mandrel 73m to fluidly seal it within the central bore of the valve sleeve 72m. Spaced-apart lateral passages 487 and 488 through the valve sleeve 72m are arranged to both be in fluid communication with the fluid passage 435 through the sleeve member 50m when the retrievable assembly 20m is seated therein.

A fluid passage 492 extends through the valve mandrel 73m from a point intermediate O-rings 486 and 486a into an upper closed chamber 71m in which is disposed a conventional pressure recorder 497. Similarly, a fluid passage 491 is provided from a point intermediate O-rings 486a and 486b downwardly through the mandrel 73m into a lower closed chamber 496 in which is disposed a pressure recorder 498. When the valve sleeve 72m is in its lower position (FIG. 25), both the upper and lower valve sleeve passages 487 and 488 are in communication with mandrel passage 491 and lower pressure chamber 496 as well as mandrel passage 492 and upper pressure chamber 495. When the valve sleeve 72m is in its upper position (FIG. 28), however, O-rings 490, 486 and 486a close-off upper sleeve passage 487 as well as mandrel passage 492 and the upper pressure chamber 495. Lower sleeve passage 488 remains in fluid communication with the lower pressure chamber 496.

The barrier valve 499 comprising the barrier sleeve 502 and a barrier mandrel 503 is illustrated in FIG. 27. It is designed to be dropped through the bore of the pipe string 12 to automatically seat in the reduced bore 500 in the lower portion of the body member 425. The overall length of the barrier valve member 497 is sufficient to maintain it in a generally perpendicular position as it descends through the bore of the pipe string 12 and its tapered lower end facilitates entry into the reduced bore 500. Packing means 501 is provided to sealingly engage the restricted bore 500 to prevent the passage of fluid around the barrier sleeve 502.

The barrier valve 499 is illustrated in FIG. 27 with the barrier mandrel 503 in the retracted position with respect to the barrier sleeve 502; however, the position of the upper portion of the barrier mandrel in its extended condition is indicated by dotted lines. When the barrier mandrel 503 is in its upper or extened position with respect to the sleeve 502, its lower end is above O-rings 507a to provide a fluid passageway through the barrier valve by means of barrier sleeve passage 504, the passage 505 through the bore of the barrier mandrel 503 and lateral passages 506 through the upper portion of the barrier mandrel 503. When the barrier mandrel 503 is in its lower or retracted position with respect to the barrier sleeve 502, the barrier sleeve port 504 below the seal 501 is closed by seal rings 506 and 507.

Any suitable means may be used to provide a restricted bore 500 in the body 425, such as a threaded sleeve 508 which is illustrated in FIG. 27. To insure a fluid tight seal between the threaded sleeve 508 and body member 425, a sealing means such as O-ring 508a may be provided.

The barrier mandrel 503 is provided with a fishing-head portion 509 by which a conventional overshot or grapple may be used to retrieve it from its seated position in the body member 425. A shear pin 513 may be provided to initially hold the barrier mandrel 503 in its extended position to maintain the passageway through the barrier valve 499 open to facilitate its movement into its seated position within the restricted bore 500 of the body member 425. As illustrated in FIG. 27, the shear pin 513 has already been sheared and the barrier mandrel 503 is in its lower position.

Valve mandrel 73m as illustrated in FIGS. 26 and 31 is adapted to control the sleeve member locking device when a series of samples are to be taken at a single test zone with the packer 426 remaining inflated between samples. The valve sleeve 73m is provided with a shear pin collar 480 adapted to operate the ball-lock sleeve 457. Longitudinally spaced above the shear-pin collar 480, a landing collar 510 is provided with protruding lugs 511 adapted to engage the tapered shoulder 512 at the upper end of the sleeve member 50m.

A modified retrievable valve assembly 20n is illustrated in FIGS. 30, 32 and 33 which is adapted to take the final sample from a specific test zone. Excepting the latch control means at the upper portion of valve mandrel 73n and the provision of a grapple means 515 at the lower end of the retrievable assembly 20, the retrievable assembly 20n may be identical with the assembly 20m. The latch control means of the retrievable assembly 20n comprises a trip landingnose 516 having sufficient effective diameter to engage the ball-lock sleeve 457 when the retrievable assembly 20n enters the sleeve member 50m. Above the trip landing nose 516, a shear-pin landing collar 517 is provided with projecting lugs 518 adapted to engage the tapered shoulder 512 at the upper end of the sleeve member 50m. The shear-pin landing collar 517 is initially held adjacent the trip landing nose 516 by shear pin 519 which is designed to shear at a predetermined pump pressure within the bore of the pipe string 12.

In FIG. 33, the apparatus of FIG. 32 is illustrated with the retrievable assembly 20n seated in the sleeve member 50m after the application of sufficient pump pressure in the bore of the pipe string 12 to shear the pin 519. In this position the shear-pin landing collar 517 has been moved up relative to the valve mandrel 73n until it engages the hanger collar 521. When the retrievable assembly 20n is in the position shown in FIG. 33, the trip landing nose 516 engages and depresses the ball-lock sleeve 457 to release the balls 455 from their outer position.

It may be noted that retrievable assembly 20n may be employed if only one sample is to be taken from a specific test zone. However, if a single sample is to be taken from a specific test zone, the shear-pin landing collar 517 of the retrievable assembly 20n may be omitted. Its function is to prevent upward movement of the sleeve member 50m from its intermediate position when the trip landing nose 516 depresses the ball lock sleeve 457. If the sleeve member 50m is already in its upper position, however, as will be the normal situation when a single sample is taken, the shear-pin landing collar 517 is not needed for this purpose.

In the operation of the apparatus of FIGS. 24 through 33, the packer assembly 19m is positioned within the borehole 10 in the arrangement shown in FIG. 15 by attaching it to the pipe string 12 and attaching the drill bit 300 below the packer assembly before drilling into what is expected to be a producing formation. The barrier valve 499 illustrated in FIG. 27 with the barrier mandrel 503 held in its upper position by shear pin 500 is initially inserted in the body member 425 by dropping it into the bore of the pipe string 12 whenever a zone to be tested has been penetrated by the drill bit 300. The retrievable assembly 20m may then be lowered into the position shown in FIG. 31.

The weight of the retrievable assembly 20n moves the ball-lock sleeve 457 down until it shoulders thereby unlocking balls 455 and the sleeve member 50m is moved to its lower position. An additional load is then imposed upon the assembly 20m by raising the pump pressure to a predetermined level, for example 500-p.s.i.g. Under this pressure, the packer element 426 is expanded and the pin 481 shears and the retrievable assembly 20m drops downwardly until the landing collar lugs 511 engage the tapered shoulder 512 of the sleeve member 50m. The assembly 20m will then be in the position indicated in FIG. 26.

As previously noted, when the barrier valve 499 is permitted to fall into position in the body member 425, the shear pin 513 will retain the barrier mandrel 503 in its upper position relative to the barrier valve sleeve 502. The passage 505 through the barrier valve 499 is thus open and pressure is equalized above and below the reduced bore portion 500 of the body member 425. When the pump pressure is raised to shear the pin 481 and lower the retrievable assembly 20m to its lower seated position within the sleeve member 50m, the lower end of the valve mandrel 73m engages the upper end of the barrier valve mandrel 503, shearing the pin 513 and moving the barrier valve mandrel 503 to its lower position relative to the barrier valve sleeve 502. In this condition the barrier valve 499 is closed by O-rings 507 and 507a which close the sleeve passage 504.

When the pin 481 is sheared by the foregoing step, the shear pin collar 517 is moved upwardly relative to the valve mandrel 73 under the force of the ball-lock sleeve spring 461, thus permitting the ball-lock sleeve 457 to return to its upper position where it locks the balls 455 in their outer position (FIG. 26).

The pump pressure may then be increased to a second predetermined level, for example 750-p.s.i.g., sufficient to move the valve sleeve 72m downwardly against the force of valve sleeve spring 479 to the position shown in FIG. 25. In this position, fluid communication is established through body passage 432, sleeve fluid passage 435, valve sleeve fluid passage 487, valve mandrel passage 492 and valve sleeve passage 488 which communicate with valve mandrel passage 491. If a shut-in pressure reading is desired the well fluid will normally be permitted to flow for only a short time interval and the pump pressure reduced slightly to permit the valve sleeve 72m to move to its upper position by the action of the valve spring 479 (FIG. 28). In this position, only the lower pressure recorder chamber 496 will be open. The pump pressure may then be increased again to the predetermined level necessary to return the valve sleeve 72m to its downward position (FIG. 25) and a sample of the fluid from the test zone taken in the manner heretofore described.

When the retrievable assembly 20m is removed from the packer assembly 19m, the sleeve member 50m is retained in its intermediate position as shown in FIG. 29. Contamination of the packed-off test zone below packer element 426 is prevented by the barrier valve 499 which closes the bore of the body member 425 and by the position of the sleeve member 53 which closes the body fluid passage 432. Drilling fluid may be circulated, however, between testing operations from the pipe string 12 through port 453 and by-pass passage 433 into the annulus in the well bore. The pressure in annular space 427 necessary to maintain the packer element 426 in its inflated condition between tests is maintained by the check valve 431 and by the position of the O-rings 442 and 443 on the sleeve member 50m which close the deflating passage 434.

When the final sample from a specific zone is to be taken, the retrievable assembly 20n illustrated in FIGS. 30, 32 and 33 is lowered into position to operate the ball lock mechanism to permit the sleeve member 50m to return to its upper position as shown in FIG. 24 and to retrieve the barrier valve member 499. The shear pin 519 is sheared by an initial predetermined pressure, for example 500-p.s.i.g., releasing the shear pin landing collar 517 and moving the assembly 20n downwardly from the position shown in FIG. 32 to the seated position shown in FIG. 33. When the retrievable assembly 20n is seated within the sleeve member 50m as shown in FIG. 33, the ball-lock sleeve 457 is maintained in its lower position by trip-landing nose 516, unlocking the balls 455. During this step, the grapple member 515 (FIG. 30) passes over and engages the retrieving head 509 of the barrier member 499.

After the final sample has been taken, the retrievable assembly 20n is raised from its seated position within the sleeve member 50m and, initially, the sleeve member 50m is moved upwardly with the movement of the retrievable assembly 20n by the force of the sleeve spring 473. Since the ball-lock sleeve 457 is held in its lower position by trip landing nose 516, the sleeve 457 continues to follow the retrievable assembly 20n upwardly until it reaches its upper position. The initial upward movement of the retrievable assembly 20n also moves the barrier valve mandrel 503 by means of grapple 515 (FIG. 30) to its upward position relative to the barrier valve sleeve 502, permitting fluid flow through the barrier valve 499 to equal pressure above and below the reduced bore portion 500 of the body member 425 to facilitate removal of the barrier valve from its seated position.

The apparatus of this invention may be modified as indicated in the drawing of FIG. 34 to provide a retrievable valve assembly 20p adapted for the treating of a selected formation. This tool may be identical with any of the prior modifications of the retrievable valve assembly for all portions below the upper portion of the valve mandrel 73p containing the chamber 531. In this modification, a floating piston 532 is provided with O-rings 533 as an upper closure for the treating chamber 531. Near the upper end of the valve mandrel 73p, one or more lateral ports 535 are provided for fluid communication between the bore of the pipe string 12 and a hydraulic chamber 536 above the piston.

Suitable means to limit the upward travel of the floating piston 533 may be provided such as rod 537 which is of sufficient length to prevent the floating piston 532 from rising above the ports 535. The rod 537 may be conveniently attached to the cap 539.

For some applications, it may be desirable to omit the floating piston 533 in order to introduce through the bore of the pipe string large qualities of treating fluid which can be introduced into a test zone by means of ports 535.

The tool 20p may be used with acid or other desired treating material in the chamber 531. The treating material may be introduced into the chamber 531 by removing the cap 539 and piston 532. The filling operation may be facilitated by the use of a suitable jig to operate the valve sleeve of the retrievable valve assembly. The passage to the valve chamber 531 is then closed by manipulation of the jig and a supply of acid or other material introduced into the chamber 531 and the floating piston 532 is disposed thereabove. The tool 20p is then reassembled and introduced into the bore of the pipe string 12 in the manner previously described for testing operations. When the retrievable assembly 20p is seated within the packer assembly, pressure can be applied in the pipe string to open the chamber valve means. Depending upon the embodiment of the retrievable assembly 20 used for the lower portion of this device, either the valve mandrel 73 may be moved relative to the valve sleeve 72″ as, for example, in the embodiment of FIG. 10; or the valve sleeve 72m may be moved relative to the valve mandrel 73m as, for example, in the embodiment of FIG. 25. When the chamber 531 is placed in fluid communication with the packed-off zone of the well bore, the pump pressure within the pipe string 12 forces the floating piston 532 downwardly displacing the acid or treating fluid into the formation.

As one example of the use of treating chamber 531 of retrievable valve assembly 20p, it may be used to determine the effect of acidizing a formation by: (1) obtaining a test sample of formation fluid during drilling of a formation using, for example, the retrievable assembly 20m of FIG. 25; (2) removing the sample of fluid for analysis; (3) treating the formation with acid using the treating chamber 531 of the retrievable assembly 20p; (4) removing the retrievable assembly 20p; and (5) conducting a further test of formation fluid by means of retrievable assembly 20m to determine the difference in production from the zone before and after acidizing.

If extensive acidizing should be required the retrievable assembly 20p may be used, omitting the floating piston 532 and large quantities of acid or other treating material may then be injected into the formation by pumping the acid through the drill string 12.

It may be noted that volatile materials or liquids under pressure or certain inert gases, such as carbon dioxide, are sometimes introduced as treating materials into a formation. A retrievable assembly of this invention, such as the embodiment of 20m, may be used for this purpose by introducing into the sample chamber the material in liquified form under high pressure. Such materials will normally have sufficient pressure at the temperatures of the well bore to overcome the hydrostatic pressure of the well fluid and/or any pressure in the test zone to permit the formation to be exposed to such gas, volatile liquid, or fluid under pressure when the valve mechanism of the retrievable assembly is opened in the manner previously described in connection with testing operations.

While particular embodiments of the present invention have been shown and described, it is apparent that changes and modifications may be made without departing from this invention in its broader aspect, and therefore the aim in the appended claims is to cover all such changes and modifications as fall within the true spirit and scope of this invention.

I claim:

1. A well tool comprising a tubular body member adapted for connection to a pipe string; packer means including upper and lower inflatable packers arranged in longitudinally spaced-apart relationship about said body member for inflation to seal off a zone of the well bore, said body member having test and equalizing passages providing fluid communication between the bore thereof and the sealed-off zone of the well bore between said packers, and said body member having inflating and deflating passages providing fluid communication between the bore of said body member and said packer means; a check valve located in said inflating passage and arranged to permit irreversible flow of fluid from the bore of said body member into said packer means; a check valve located in said test passage and arranged to permit irreversible flow of fluid from the portion of the well bore between said packers into the bore of said body member; a sleeve member mounted for limited longitudinal movement between upper and lower positions within the bore of said body member, said sleeve member having a substantially unrestricted bore therethrough to continue substantially the full bore of said well pipe, said sleeve member and said body member defining a bypass passage providing fluid communication between the portions of the well bore located above said upper packer and below said lower packer, said sleeve member having a test and equalizing port arranged to register with said body member equalizing passage in said upper position and arranged to register with said body member test passage in said lower position selectively to open such passages, said sleeve member having a deflating port arranged to register with said body member deflating passage in said upper position, and said sleeve member being arranged to close said body member equalizing and deflating passages in said lower position; means normally urging said sleeve member toward its upper position; means for releasably locking said sleeve member in its lower position; a retrievable valve assembly adapted to be lowered through the well pipe into a seated position within said sleeve member to move said sleeve member to its lower position and including upper and lower telescopically arranged portions movable relative to one another between extended and retracted positions, means normally urging said upper and lower portions toward their extended position, and means to operate said locking means to release said sleeve member to its upper position when said valve assembly is retrieved; said upper and lower portions of said valve assembly together defining a pressure-responsive sleeve valve operable by fluid pressure applied via the bore of said well pipe when said valve assembly is seated within said sleeve member to move said upper and lower portions to their retracted position, said valve assembly including a sample-receiving chamber and a pressure chamber, said sleeve valve providing selective fluid communication between said pressure chamber and said test passage in said extended position, and between said test passage and both of said chambers in said retracted position; and pressure measuring means located in each of said sample-receiving and pressure chambers.

2. A well tool comprising a tubular body member adapted for connection to a pipe string; packer means including upper and lower inflatable packers arranged in longitudinally spaced-apart relationship about said body member for inflation to seal off a zone of a well bore, said body member having a test and equalizing passage providing fluid communication between the bore thereof and the sealed-off zone of the well bore between said packers, said body member having inflating and deflating passages providing fluid communication between the bore thereof and said packer means; a check valve located in said inflating passage and arranged to permit irreversible flow of fluid from the bore of said body member into said packer means; a sleeve member mounted for limited longitudinal movement between upper, intermediate and lower positions within the bore of said body member, said sleeve member having a substantially unrestricted bore therethrough to continue substantially the full bore of said well pipe, said sleeve member and said body member defining a by-pass passage providing fluid communication between the portions of the well bore located above said upper packer and below said lower packer, said sleeve member having test, equalizing and deflating ports therethrough, said sleeve member test port being arranged to register with and open said body member test and equalizing passage and said sleeve member being arranged to close said body member deflating passage in said lower position, said sleeve member equalizing port being arranged to register with said body member test and equalizing passage and said sleeve member deflating port being arranged to register with said body member deflating passage in said upper position, and said sleeve member being arranged to close said body member test and equalizing passage and said body member deflating passage in said intermediate position; means normally urging said sleeve member from its lower position toward its intermediate position; means for releasably locking said sleeve member selectively in its intermediate and upper positions; a retrievable valve assembly adapted to be lowered through the well pipe into a seated position within said sleeve member to move said sleeve member to its lower position and including upper and lower telescopically arranged portions movable relative to one another between extended and retracted positions, means normally urging said upper and lower portions toward their extended position, and means to operate said locking means to release said sleeve member to its upper position when said valve assembly is retrieved; said upper and lower portions of said valve assembly together defining a pressure-responsive sleeve valve operable by fluid pressure applied via the bore of said well pipe when said valve assembly is seated within said sleeve member to move said upper and lower portions to their retracted position, said valve assembly including a sample-receiving chamber and a pressure chamber, said sleeve valve providing selective fluid communication between said pressure chamber and said test passage in said extended position, said sleeve valve providing fluid communication between said test passage and both of said chambers in said retracted position; and pressure measuring means located in each of said sample-receiving and pressure chambers.

3. A well tool comprising: a tubular body member adapted for connection to a pipe string; annular packer means secured to said body member and adapted for lateral expansion to seal off a well bore, a tubular sleeve member slidably received in said bore of said body member for movement between longitudinally-spaced positions; fluid communication means including a test valve in said sleeve member and said body member arranged for placing the bore of said body member and a sealed-off well bore exterior to said body member in fluid communication in one of said longitudinal positions; a retrievable sampling assembly adapted to be lowered through the pipe string into a seated position within the bore of said sleeve member and shift said sleeve member to said one longitudinal position; said assembly including a sampling chamber and means for placing said sampling chamber in fluid communication with said test valve means; and means in said body member for releasably securing said sleeve member in said one longitudinal position where said test valve is normally open.

4. A well tool comprising a tubular body member adapted for connection to a pipe string and having a substantially unrestricted bore therethrough; and annular inflatable packer means secured to said body member and adapted for lateral expansion to seal off a zone of a well bore, said body member having a test passage providing fluid communication between the bore thereof and the sealed-off zone of the well bore, said body member including means for controlling inflation and deflation of said packer means, said packer means including a packer return sleeve secured to one end of said packer means slidably fitted about said body member and defining therewith a sealed chamber at low pressure which is expanded against hydrostatic well pressure by relative movement between said sleeve and body member when said packer means is inflated, said return sleeve when said packer means is deflated promoting deflation in response to hydrostatic well pressure acting to collapse said chamber.

5. A well tool comprising a tubular body member adapted for connection to a pipe string and having a substantially unrestricted bore therethrough; and annular inflatable packer means secured to said body member and adapted for lateral expansion to seal off a zone of a well bore, said packer means including a pair of inflatable packers, a spacer sleeve slidably mounted on said body member and secured in fluid-tight relation to adjacent ends of said packers, said spacer sleeve having a test passage in fluid communication with a test passage through said body member, seal means carried between said body member and spacer sleeve to isolate said passages from inflating fluid in said packers, and means including a packer return sleeve slidably mounted in sealed relation on said body member and secured to one of the remote ends of said packers, said return sleeve and said body member defining a sealed chamber at low pressure which is expanded against hydrostatic well pressure by relative movement between said sleeve and body member when said packer means is inflated, said return sleeve when said packer means is deflated promoting deflation in response to hydrostatic well pressure acting to collapse said chamber.

6. A well tool comprising: a tubular body member adapted for connection to a pipe string; annular packer means secured to said body member and adapted for lateral expansion to seal off a well bore, a tubular sleeve member slidably received in said bore of said body member for movement between longitudinally-spaced positions; fluid communication means including a first test valve means in said sleeve member and said body member arranged for placing the bore of said body member and a sealed-off well bore exterior to said body in fluid communication in one of said longitudinal positions; means for sealing said first test valve means relative to the bore of said body member above and below said test valve means; a retrievable sampling assembly adapted to be lowered through the well pipe into a seated position within the bore of said sleeve member and shift said sleeve member to said one longitudinal position; said assembly including a sampling chamber and a second test valve means for placing said sampling chamber in fluid communication with said first test valve means; means for sealing said sampling assembly relative to said sleeve member above and below said first and second test valve means, said body member and sleeve member having bypass means for placing the exterior of said body member above said packer means in fluid communication with the bore of said body member below said means for sealing said sampling assembly relative to said sleeve member.

7. A well tool comprising a tubular body member adapted for connection to a pipe string and having a substantially unrestricted bore therethrough; and annular packer means secured to said body member and adapted for lateral expansion to seal off a zone of a well bore, said body member having a test passage providing fluid communication between the bore thereof and a sealed-off zone of the well bore, said body member having a valve sleeve slidably mounted in its bore and having a portion thereof for controlling flow through said test passage, means for releasably retaining said valve sleeve in one of its slidable positions, said body member having passages cooperating with passages extending along the exterior of said valve sleeve above and below said flow-controlling portion thereof and together defining a bypass passage extending from an opening to the exterior of the well tool above said test passage and said packer means to an opening to the bore of said body member below said test passage for providing fluid communication between the bore of said body member at a point displaced below said test passage and the annulus of the well bore above said sealed-off zone.

8. In a well tool wherein a tubular body member adapted for connection to a pipe string has a bore therethrough and packer means are secured to said body member for lateral expansion to seal off a zone of a well bore, said body member having a test passage providing fluid communication between the bore thereof and the sealed-off zone; the improvement comprising a retrievable sampling assembly adapted to be lowered through the well pipe, supporting means for retaining said retrievable sampling assembly in a seated position within the bore of the body member adjacent said test passage, said assembly including a valve mandrel having a sample-receiving chamber with a test port and a separate pressure chamber with an access port, a valve sleeve mounted for limited sliding movement about said valve mandrel between two positions and having seal means spaced above and below a ported portion thereof to seal above and below said test passage when said sampling assembly is seated, and means for urging said mandrel upwardly relative to said valve sleeve, said ported portion of said valve sleeve providing fluid communication from said test passage into said sample-receiving chamber via said test ports in only one of said positions and into said pressure chamber via said access port in both of said positions, and means for detecting pressure in the respective chambers.

9. A well tool comprising: a tubular body member adapted for connection to a pipe string and having a bore therethrough; packer means secured to said body member for lateral expansion to seal off a zone of a well bore; hydraulic means for expanding said packer means; valve means providing fluid communication between the bore of said body member and said hydraulic means whereby said packer means may be expanded by fluid pressure applied through said well pipe and said valve means; a retrievable sampling assembly adapted to be lowered through the well pipe into a seated position within the bore of said body member and opening said valve means, said assembly including means to permit fluid communication between the interior of said assembly and the sealed-off zone of the well bore when said assembly is seated within said body member; and mean in said body member retaining said valve means closed when said sampling assembly is raised from said seated position whereby said sampling assembly can be retrieved without retracting said packer means.

10. A well tool comprising: a tubular body member adapted for connection to a string of well pipe and having a bore therethrough; inflatable packer means secured to said body member for lateral expansion to seal off a zone of a well bore, said body member having a test passage providing fluid communication between the bore thereof and said sealed-off zone; an inflating passage providing fluid communication between the bore of said body member and said packer means; a deflating passage providing fluid communication between the bore of said body member and said packer means; sleeve valve means for selectively opening and closing said inflating and deflating passages whereby when said deflating passage is closed said packer means may be expanded by fluid pressure applied through said well pipe and said inflating passage; a retrievable sampling assembly adapted to be lowered through the well pipe into a seated position within the bore of said body member, said assembly including test valve means to permit fluid communication between the interior of said assembly and said test passage when said assembly is seated within said body member; said sleeve valve means including a sleeve member carried by said body member and responsive to seating of said sampling assembly in said bore of said body member for selectively closing said deflating passage; means for releasably retaining said sleeve member in a position where said deflating passage is closed; and means for controlling said inflating passage to hold pressure in said packer means when the fluid pressure in the well pipe is reduced whereby said sampling assembly can be retrieved without deflating said packer means.

11. A well tool comprising a tubular body member adapted for connection to a string of well pipe and having a bore therethrough; an annular packer means secured to said body member and adapted for lateral expansion to seal off a zone of a well bore, said body member having a body test passage providing fluid communication between the bore thereof and a sealed-off zone of the well bore, said body member having a sleeve member slidably mounted in its bore, said sleeve member having a sleeve test passage providing fluid communication from said body test passage to the bore of said sleeve member in one longitudinal position of said sleeve member, said sleeve member having a flow controlling portion; said body member having passages cooperating with passages extending along the exterior of said sleeve member above and below said flow-controlling portion thereof and together defining a bypass passage extending from an opening to the exterior of the well tool above said test passage and said packer means to an opening in the bore of said body member below said test passage for providing fluid communication between the bore of said body member at a point displaced below said test passage and the annulus of the well bore above said sealed-off zone.

12. A well tool comprising a tubular body member adapted for connection to a pipe string; annular packer means secured to said body member and adapted for lateral expansion to seal off a well bore; a tubular sleeve member slidably received in said bore of said body member for movement between longitudinally-spaced positions; sealing means between the upper end of said sleeve member and the bore of said body member; first fluid communication means including a test passage in said sleeve member and a test passage in said body member arranged for placing the bore of said body member and a sealed-off well bore exterior to said body in fluid communication in one of said longitudinal positions; a retrievable sampling assembly adapted to be lowered through the well pipe into a seated position within the bore of said sleeve member and shift said sleeve member to said one longitudinal position; means for sealing said sampling assembly in said sleeve member bore above and below said first fluid communication means; said assembly including a sampling chamber and means for placing said sampling chamber in fluid communication with said test passage in said sleeve member; second fluid communication means including a second passage in said sleeve member arranged for placing the bore of said sleeve member and the well bore above said packer means in fluid communication in said one longitudinal position.

13. A well tool comprising a tubular body member adapted for connection to a pipe string; annular packer means secured to said body member and adapted for lateral expansion to seal off a well bore; a tubular sleeve member slidably received in said bore of said body member for movement between longitudinally-spaced positions; first fluid communication means including a test passage in said sleeve member and a body test passage in said body member, said test passages being arranged for placing the bore of said body member and a sealed-off well bore exterior to said body member in fluid communication in one of said longitudinal positions; means for sealing said sleeve member in said bore of said body member above and below said test passages; a retrievable sampling assembly adapted to be lowered through the well pipe into a seated position within the bore of said sleeve member and shift said sleeve member to said one longitudinal position; means for sealing said sampling assembly in said sleeve member bore above and below said sleeve test passage; second fluid communication means including a second passage in said sleeve member arranged for placing the bore of said body member below said sealing means and the well bore above said packer means in fluid communication in said one longitudinal position; said assembly having a first chamber opening to said sleeve test passage intermediate of said sealing means; first pressure-measuring means in said first chamber; said assembly having a second chamber and a normally-closed sleeve valve for said second chamber, said sleeve valve being adapted to open said second chamber to said sleeve test passage intermediate of said sealing means; second pressure-measuring means in said second chamber; spring means normally retaining said sleeve valve closed, said sleeve valve being movable relative to said assembly to open said second chamber to said test valve.

14. A well tool comprising a tubular body member adapted for connection to a pipe string; annular inflatable packer means secured to said body member and adapted for lateral expansion to seal off a well bore, a tubular sleeve member slidably received in said bore of said body member for movement between longitudinally-spaced positions; first fluid communication means for admitting fluid to the interior of said packer means including a check valve for admitting fluid, and normally-open deflating passage means in said sleeve member and body member, said deflating passage means adapted to be closed in one of said longitudinal positions to permit inflation of said packer means; second fluid communication means including a test valve means in said sleeve member and said body member arranged for placing the bore of said body member and a sealed-off well bore exterior to said body in fluid communication in said one longitudinal position; a retrievable sampling adapted to be lowered through the well pipe into a seated position within the bore of said sleeve member and shift said sleeve member to said one longitudinal position; said assembly including a sampling chamber and means for placing said sampling chamber in fluid communication with said second fluid communication means.

15. A well tool comprising: a tubular body member adapted for connection to a pipe string; annular packer means secured to said body member and adapted for lateral expansion to seal off a portion of a well bore; a tubular sleeve member slidably received in said bore of said body member for movement between first and second longitudinally-spaced positions; fluid communication means including a fluid passage in said sleeve member and a fluid passage in said body member arranged for placing the bore of said body member and a sealed-off portion of a well bore exterior to said body member in fluid communication in said first longitudinal position and to close said body member fluid passage in said second longitudinal position; a retrievable valve assembly adapted to be lowered through the pipe string into a seated position within the bore of said sleeve member and shift said sleeve member to said first longitudinal position; said assembly including a tubular mandrel and means for placing said tubular mandrel in fluid communication with said fluid communication means; and means in said body member for releasably securing said sleeve member in said first longitudinal position.

16. The apparatus of claim 15 in which said packer means comprises an inflatable packer, and further including: second and third fluid passages in said body member providing communication between the bore of said body member and said packer means; said sleeve member further having a second passage arranged to register with said third body member passage in said second position for deflating said packer means; and said sleeve member being arranged to close said third body member passage in said first position and to close said second body member passage in said second position.

17. The apparatus of claim 15 and further including: said valve assembly having a sample-receiving chamber in communication with said tubular mandrel; said valve assembly having a pressure chamber; said valve assembly including a chamber valve means operable by a fluid pressure applied in the bore of said pipe string when said valve assembly is seated within said sleeve member to position said chamber valve means between first and second positions; said chamber valve means providing fluid communication between said pressure chamber and said sleeve member fluid passage in said first position and between said sleeve member fluid passage and both of said chambers in said second position; and pressure measuring means located in each of said sample-receiving and said pressure chambers.

18. The apparatus of claim 15 and further including a check valve located in said body fluid passage and arranged to permit irreversible flow of fluid from said sealed-off portion of the well bore into the bore of said body member.

19. The apparatus of claim 15 and further including: means normally urging said sleeve member toward said second position; and said retrievable valve assembly including means to operate said releasable securing means to release said sleeve member for movement to its second position when said valve assembly is retrieved.

20. The apparatus of claim 15 and further including: said body member having a bypass passage from the annulus between the body member and the well bore above said packer means and the bore of said body member; a sleeve member bypass passage communicating with said body member bypass passage; said bypass passages being arranged to provide fluid communication between portions of the well bore located above said packer means and the bore of said body member below said fluid communication means.

21. The apparatus of claim 20 in which said sleeve member bypass passage is arranged for fluid communication with said body member bypass passage when said sleeve member is in the first position and to close said bypass passages when said sleeve member is in said second position.

22. The apparatus of claim 20 and further including: said body member having a reduced bore below said sleeve member, and a barrier member adapted to be seated in said reduced bore of said body member to close the bore of said body member below said sleeve member.

23. The apparatus of claim 22 and further including: means normally urging said sleeve member toward said second position; said retrievable valve assembly including means to operate said releasable securing means to release said sleeve member for movement to its second position when said valve assembly is retrieved; and means for retrieving said barrier member.

24. A well tool comprising: a tubular body member adapted for connection to a pipe string; annular packer means secured to said body member and adapted for lateral expansion to seal off a portion of a well bore, a tubular sleeve member slidably received in said bore of said body member for movement between upper, intermediate and lower positions within the bore of said body member; fluid communication means including a sleeve fluid passage in said sleeve member and a body fluid passage in said body member arranged for placing the bore of said body member and a sealed-off portion of well bore exterior to said body in fluid communication in said lower longitudinal position and to close said body fluid passage in said upper and said intermediate longitudinal positions; a retrievable valve assembly adapted to be lowered through the pipe string into a seated position within the bore of said sleeve member and to shift said sleeve member to said lower longitudinal position; said assembly including a tubular mandrel and means for placing said tubular mandrel in communication with said fluid communication means; and means in said body member for releasably securing said sleeve member selectively in its intermediate position and upper positions.

25. The apparatus of claim 24 in which said packer means comprises an inflatable packer, and further including: second and third fluid passages in said body member providing communication between the bore of said body member and said packer means; said sleeve member having a second passage arranged to communicate with said third body passage in said upper position for deflating said packer means and said sleeve member being arranged to close said third body passage in said lower and intermediate positions; and said sleeve member being arranged to close said second body passage in said upper position.

26. The apparatus of claim 24 and further including: said valve assembly having a sample-receiving chamber in communication with said tubular mandrel; said valve assembly having a pressure chamber; said valve assembly including a chamber valve means operable by a fluid pressure applied in the bore of said pipe string when said valve assembly is seated within said sleeve member to position said chamber valve means between first and second positions; said chamber valve means providing fluid communication between said pressure chamber and said test passage in said first position and between said test passage and both of said chambers in said second position; and pressure measuring means located in each of said sample-receiving and said pressure chambers.

27. The apparatus of claim 24 and further including means normally urging said sleeve member toward said intermediate position and upper positions.

28. The apparatus of claim 24 and further including: means normally urging said sleeve member toward said upper position; and said retrievable valve assembly including means to operate said releasable securing means to release said sleeve member for movement to its upper position when said valve assembly is retrieved.

29. The apparatus of claim 24 and further including: said body member having a bypass passage between the annulus between the body member and the well bore above said packer means and the bore of said body member; a sleeve bypass passage communicating with said body bypass passage; said port and bypass passages being arranged to provide fluid communication between portions of the well bore located above said packer means and the bore of said body member below said fluid communication means.

30. The apparatus of claim 29 and further including: said body member having a reduced bore below said sleeve member, and a barrier member adapted to be seated in said reduced bore of said body to close the bore of said body below said sleeve member.

31. The apparatus of claim 29 in which said sleeve bypass passage is arranged for fluid communication with said body bypass passage when said sleeve member is in the lower and intermediate positions and to close said body bypass passage when said sleeve member is in the upper position.

32. The apparatus of claim 31 and further including: means normally urging said sleeve member toward said upper position; said retrievable valve assembly including means to operate said releasable securing means to release said sleeve member for movement to its upper position when said valve assembly is retrieved; and said retrievable valve assembly further including means for retrieving said barrier member.

33. A well tool comprising: a tubular body member adapted for connection to a string; annular packer means secured to said body member and adapted for lateral expansion to seal off a well bore, hydraulic expander means for expanding said packer means in response to fluid pressure in said expander means in excess of pressure in the well bore; said body having a passage communicating with said hydraulic expander means to permit flow of fluid from the bore of said body member to said expander means; a tubular sleeve member slidably received in said bore of said body member for movement between first and second longitudinally-spaced positions; said sleeve member being arranged to open said passage communicating with said expander means in said first position and to close said passage in said second position; means normally urging said sleeve member toward said second position; a retrievable valve assembly adapted to be lowered through the well pipe into a seated position within the bore of said sleeve member; means cooperable between said valve assembly and said sleeve member for shifting said sleeve member to said first longitudinal position; said assembly including a tubular mandrel and means for placing said tubular mandrel in fluid communication with fluid in the well bore below said packer means.

34. A well tool comprising: a tubular body member adapted for connection to a pipe string and having a bore therethrough; inflatable packer means secured to said body member for lateral expansion to seal off a zone of a well bore; a first flow passage in said body member providing fluid communication between the bore thereof and the sealed off zone of the well bore; a first deflating passage in said body member providing fluid communication between said packer means and the bore of said body member; inflating valve means in said body member for placing said packer means in fluid communication with the bore of said body member; and a selectively operative sleeve member slidably movable in the bore of said body member between first and second positions, said sleeve member including a second flow passage and a second deflating passage, said sleeve member in said first position placing said deflating passages in fluid communication while preventing flow through said flow passages and in said second position placing said flow passages in fluid communication while preventing flow through said deflating passages.

References Cited by the Examiner
UNITED STATES PATENTS

| | | | |
|---|---|---|---|
| 1,896,492 | 2/1933 | Macready | 166—3 |
| 2,217,043 | 10/1940 | Boynton | 166—152 X |
| 2,751,014 | 6/1956 | Johnston et al. | 166—145 |
| 2,806,539 | 9/1957 | Green et al. | 166—142 X |
| 2,831,541 | 4/1958 | Conover | 166—147 |
| 2,836,246 | 5/1958 | Hoch | 166—3 |
| 2,978,046 | 4/1961 | True | 166—162 X |
| 3,111,169 | 11/1963 | Hyde | 166—145 |

OTHER REFERENCES

Bleakley, W. B., "Modern Drill Stem Testing," The Oil and Gas Journal, December 22, 1958, vol. 56, No. 51, pp. 59–63.

CHARLES E. O'CONNELL, *Primary Examiner.*

JACOB L. NACKENOFF, *Examiner.*

D. H. BROWN, *Assistant Examiner.*